US007366502B2

(12) United States Patent
Okada

(10) Patent No.: US 7,366,502 B2
(45) Date of Patent: Apr. 29, 2008

(54) SENDING METHOD OF PAY CONTENTS, RADIO TERMINAL AND CARRIER

(75) Inventor: Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/969,038

(22) Filed: Oct. 21, 2004

(65) Prior Publication Data

US 2005/0222858 A1    Oct. 6, 2005

(30) Foreign Application Priority Data

Mar. 31, 2004   (JP)   ............................. 2004-102943

(51) Int. Cl.
*H04M 3/42* (2006.01)
*G06Q 30/00* (2006.01)
*G06Q 40/00* (2006.01)

(52) U.S. Cl. .................. 455/414.1; 455/405; 705/1; 705/39; 902/39

(58) Field of Classification Search .............. 455/405, 455/406, 408, 414.1, 41.1, 41.2; 379/114, 379/111; 705/39, 40, 26, 1; 902/39, 40
See application file for complete search history.

(56) References Cited

U.S. PATENT DOCUMENTS

| 7,212,785 | B2* | 5/2007 | Brassil et al. ............ 455/41.2 |
| 2003/0028484 | A1* | 2/2003 | Boylan et al. ............ 705/40 |
| 2003/0054796 | A1* | 3/2003 | Tamaki et al. ............ 455/406 |
| 2005/0053423 | A1* | 3/2005 | Doubler et al. .......... 403/374.3 |
| 2005/0197098 | A1* | 9/2005 | Trossen .................. 455/406 |

FOREIGN PATENT DOCUMENTS

| EP | 0715245 | 6/1996 |
| JP | 2002-209028 | 7/2002 |
| JP | 2003-333079 | 11/2003 |

OTHER PUBLICATIONS

"Multi-hop Connection Enables Cheap Radio Network Construction", Nikkei Electronics, Jun. 17, 2002, pp. 114-115.
Extended European Search Report from the European Patent Office mailed on Jan. 16, 2008, issued with respect to the corresponding European Patent Application No. 04256567.1.

* cited by examiner

*Primary Examiner*—George Eng
*Assistant Examiner*—Nam Huynh
(74) *Attorney, Agent, or Firm*—Staas & Halsey LLP

(57) ABSTRACT

The present invention relates to a sending method of pay contents in a communication system which carry out communication through predetermined communication network (e.g., radiotelephone network or the like) using a predetermined first communication scheme (e.g., CDMA scheme or the like). The sending method includes radio terminals which carry out peer-to-peer communication using a predetermined second communication scheme (e.g., infrared communication, communication adhering to Bluetooth standards), and a carrier which carries out communication using the first communication scheme with each of the terminals. When pay contents possessed by a first radio terminal are transferred to a second radio terminal, first, permission of transfer of the pay contents to the second radio terminal is received from a carrier and then, the pay contents are transferred. After the pay contents are transferred to the second radio terminal, the carrier is informed of completion of transfer operation.

8 Claims, 40 Drawing Sheets

(A) IN THE CASE OF PUSH TYPE CONTENT OFFER
(SALES FROM A TO B)

(B) IN THE CASE OF PULL TYPE CONTENT OFFER
(SALES FROM A TO B)

(C) IN THE CASE OF PUSH TYPE CONTENT OFFER
(B REQUESTS TO BUY FROM A)

(D) IN THE CASE OF PULL TYPE CONTENT OFFER
(B DESIRES TO BUY FROM A)

(A) IN THE CASE OF PUSH TYPE CONTENT OFFER
(SALES FROM A TO B)

(B) IN THE CASE OF PULL TYPE CONTENT OFFER
(SALES FROM A TO B)

(C) IN THE CASE OF PUSH TYPE CONTENT OFFER
(B DESIRES TO BUY FROM A)

(D) IN THE CASE OF PULL TYPE CONTENT OFFER
(B DESIRES TO BUY FROM A)

(A) IN THE CASE OF PUSH TYPE CONTENT OFFER
(SALES FROM A TO B THROUGH C)

(B) IN THE CASE OF PULL TYPE CONTENT OFFER
(SALES FROM A TO B THROUGH C)

(C) IN THE CASE OF PUSH TYPE CONTENT OFFER
(B DESIRES TO BUY FROM A)

(D) IN THE CASE OF PULL TYPE CONTENT OFFER
(B DESIRES TO BUY FROM A)

SENDING METHOD OF PAY CONTENTS, RADIO TERMINAL AND CARRIER

BACKGROUND OF THE INVENTION

1. Field of the Invention

The present invention relates to a sending method of pay contents in a communication system having plural radio terminals which carry out communication through predetermined communication network (e.g., radiotelephone network or the like) using a predetermined first communication scheme (e.g., CDMA scheme or the like) and which carry out peer-to-peer communication using a predetermined second communication scheme (e.g., infrared communication, communication adhering to Bluetooth standards), and having a carrier which carries out communication using the first communication scheme between the terminals. The invention also relates to a radio terminal and a carrier suitable for the sending method.

2. Description of the Related Art

Examples of data transfer system using short-range radio between terminals are

- cashless system between a cellular phone and an automatic dispenser using infrared communication IrDA (100 kbps or less),
- data exchange between personal computers and backup using radio LAN (IEEE802.1X, 50 Mbps or less), and
- photograph transfer between cellular phones using Bluetooth (1 Mbps or less).

Especially in the widely used cellular phones, high-speed transfer carried out between cellular phones has appeal for consumers who want to share information with their associates. However, due to low speed of a radio channel and competition with carriers, the high-speed transfer has not been in common use.

To solve such a problem, there is provided a sending/receiving system of contents using the peer-to-peer communication (ad hoc communication) (e.g., see Japanese Patent Application Laid-open No.2003-333079 (JP-A) and JP-A 2002-209028.

JP-A 2003-333079 discloses a system in which a radio terminal receives commercial contents which advertises contents from a sending server which sends contents, and if the radio terminal sends the commercial contents to another radio terminal, the sender radio terminal receives a discount coupon that can be used when buying the contents advertised by the advertising contents.

JP-A 2002-209028 discloses a system in which when contents are sent to an ending terminal from a starting terminal through an ad hoc network, a relay terminal is interposed between the starting terminal and the ending terminal. In the system, the starting terminal sends the contents to the relay terminal, the relay terminal sends the contents to the ending terminal, and the relay terminal charges a fee for the service against the starting terminal and the ending terminal.

In the system disclosed in JP-A 2003-333079, however, even a terminal outside the range of the sending server which sends contents can receive advertising-contents from a radio terminal (radio terminal A) which received the advertising contents directly from the sending server, but the radio terminal outside the range of the sending server is not managed by the sending server, and it is not possible to grasp to which radio terminal the advertising contents were sent. That is, the system of 2003-333079 can be used only as a sending system of advertising free contents. In the case of sending pay contents, this system has a problem in terms of safety when the contents are sent and in terms of authenticity of radio terminals other than the radio terminal A which receives contents directly from the sending server.

The system of JP-A 2002-209028 only charges a fee for service of relay of the relay terminal in the direct communication between radio terminals. Since there is no function to grasp the entire system, it is difficult to prevent pay contents from being dispersed or distributed without limitation.

SUMMARY OF THE INVENTION

The present invention has been made in view of the above circumstances and provides a sending method of pay contents capable of sending the pay contents using peer-to-peer communication while securing the sending safety. The invention also provides a radio terminal and a carrier suitable for carrying out the sending method.

The present invention provides a sending method of pay contents in a communication system carrying out communication through a predetermined network by a predetermined first communication scheme and including a plurality of radio terminals that carry out a peer-to-peer communication by a predetermined second communication scheme and a carrier that carries out communication by the first communication scheme with each of the plurality of radio terminals, the sending method having:

a transfer permission receiving step for receiving, from the carrier, permission of transfer of predetermined pay contents to a predetermined second radio terminal of the plurality of radio terminals obtained by one of the plurality of radio terminals as a first radio terminal through communication by the first communication scheme between the carrier and the first radio terminal, a transfer step in which upon reception of the permission from the carrier in the transfer permission receiving step, the first radio terminal transfers the pay contents to the second radio terminal through communication by the second communication scheme, a completion notification receiving step in which the first radio terminal receives, from the second radio terminal, notification that reception of the pay contents is completed through communication using the second communication scheme, a completion reporting step in which the first radio terminal reports to the carrier that sending operation of the pay contents to the second radio terminal is completed, through communication using the first communication scheme, and a charging step in which the carrier charges fees concerning sending and receiving operations of the pay contents against the first radio terminal and the second radio terminal.

If safety is taken into account when the pay contents are to be sent, it seems preferable that only the first communication scheme is utilized, the carrier sends the pay contents to all the radio terminals which desire to receive the pay contents, and transfer of the pay contents between the radio terminals is prohibited. However, since the carrier usually carries out communication with extremely large number of radio terminals, if the carrier must send the pay contents, it takes long time to send due to low baud rate and the radio terminal must bear a long time communication fee for receiving the pay contents in addition to a fee of the pay contents.

Whereas, according to the sending method of pay contents of the invention, since transfer of pay contents by the peer-to-peer communication between the radio terminals is permitted, high speed transfer is possible between the radio terminals, a large number of radio terminals can transfer the pay contents in parallel, and the pay contents are allowed to become widespread at high speed.

According to the sending method of pay contents of the invention, when pay contents possessed by a first radio terminal are transferred to a second radio terminal, first, permission of transfer of the pay contents to the second radio terminal is received from a carrier and then, the pay contents are transferred. After the pay contents are transferred to the second radio terminal, the carrier is informed of completion of transfer operation. Therefore, safety of pay content transfer is secured, and the carrier grasps all information concerning sending and transferring of the pay contents, and can appropriately charge fees.

The sending method of pay contents may further include a sending step in which the first radio terminal receives the pay contents from the carrier through communication using the first communication scheme, and the sending step is carried out before the transfer permission receiving step.

The sending method of pay contents of the invention is also applied to a case in which a radio terminal that obtains pay contents through peer-to-peer communication transfers the pay contents to another radio terminal. First, the carrier may send the pay contents to a radio terminal (here, first radio terminal) using the first communication scheme.

The communication system may include, in addition to the carrier, a content offering server which sends pay contents, and the sending method further includes a sending step in which the first radio terminal receives the pay contents from the content offering server, the sending step being carried out before the transfer permission receiving step. In the charging step, the carrier charges fees concerning sending and receiving operations of the pay contents against the first radio terminal, the second radio terminal and the content offering server.

In this way the sending method of pay contents may include the content offering server that provides contents, separately from the carrier. In this case also, if the content offering server is put under the umbrella of the carrier, the carrier can grasp the transfer of pay contents and appropriately charge a fee.

In the sending method of pay contents of the invention, the transfer step and the completion notification step may be carried out by direct peer-to-peer communication between the first radio terminal and the second radio terminal, or the transfer step and the completion notification step may be carried out by peer-to-peer communication between the first radio terminal and the second radio terminal relayed by at least one of the plurality of radio terminals as a third radio terminal. When pay contents are to be transferred through peer-to-peer communication with the interposed third radio terminal, in the charging step, the carrier charges fees concerning the sending and receiving operation of pay contents against the first, second and third radio terminals.

By permitting the relay, pay contents can be transferred even between two radio terminals which are so far away from each other that the peer-to-peer communication can not directly be carried out. Since a radio terminal under the umbrella of the carrier is allowed to relay, safety of transfer of pay contents is secured.

In the sending method of pay contents of the invention, in the transfer step and the completion notification step, when it is impossible to carry out peer-to-peer communication between the first radio terminal and the second radio terminal directly or relayed by at least one of plural radio terminals as a third radio terminal, communication is carried out utilizing a communication path at least partially including a communication path using the first communication scheme having the carrier interposed in the communication path.

In this manner, when peer-to-peer communication can not be used, it is possible to set a transfer route for pay contents through the carrier.

The present invention also provides any one of plural radio terminals each carrying out communication using a predetermined first communication scheme between the radio terminal and a carrier which carries out communication through a predetermined communication network using the first communication scheme, and each carrying out peer-to-peer communication using a predetermined second communication scheme with each of the plural radio terminals, wherein the one of the plural radio terminals includes:

a transfer permission receiving unit which receives, from the carrier, permission of the transfer of predetermined pay contents to a predetermined second radio terminal of the plurality of radio terminals, the permission obtained by the one of the plurality of radio terminals by communication using the first communication scheme, a transfer step in which upon reception of the permission from the carrier in the transfer permission receiving unit, the pay contents are transferred to the second radio terminal through communication using the second communication scheme, a completion notification receiving unit that receives notification that receiving operation of the pay contents from the second radio terminal is completed, through communication using the second communication scheme, and a completion reporting unit in which the carrier is informed that sending operation of the pay contents to the second radio terminal is completed, through communication using the first communication scheme.

In addition, the present invention also provides a carrier which carries out communication through a predetermined communication network using a predetermined first communication scheme and which carries out communication using the first communication scheme with each of plural radio terminals which carries out peer-to-peer communication using a predetermined second communication scheme, wherein the carrier includes:

a transfer permitting unit which permits any one of the plural radio terminals as a first radio terminal to transfer predetermined pay contents obtained by the first radio terminal to a predetermined second radio terminal of the plural radio terminals, a completion report receiving unit which receives a report that sending operation of the pay contents to the second radio terminal from the first radio terminal is completed, and a charging unit which charges fees concerning sending and receiving operations of the pay contents against the first radio terminal and the second radio terminal.

As explained above, according to the present invention, it is possible to transfer pay contents by means of peer-to-peer communication between radio terminals while securing safety.

DETAILED DESCRIPTION OF THE INVENTION

Embodiments of the present invention will be explained below.

Concerning distribution of pay contents here, the pay contents are always encrypted and copyright thereof is always protected in both a sender and a receiver. Thus, a carrier checks contractors all the time.

Figure 1:
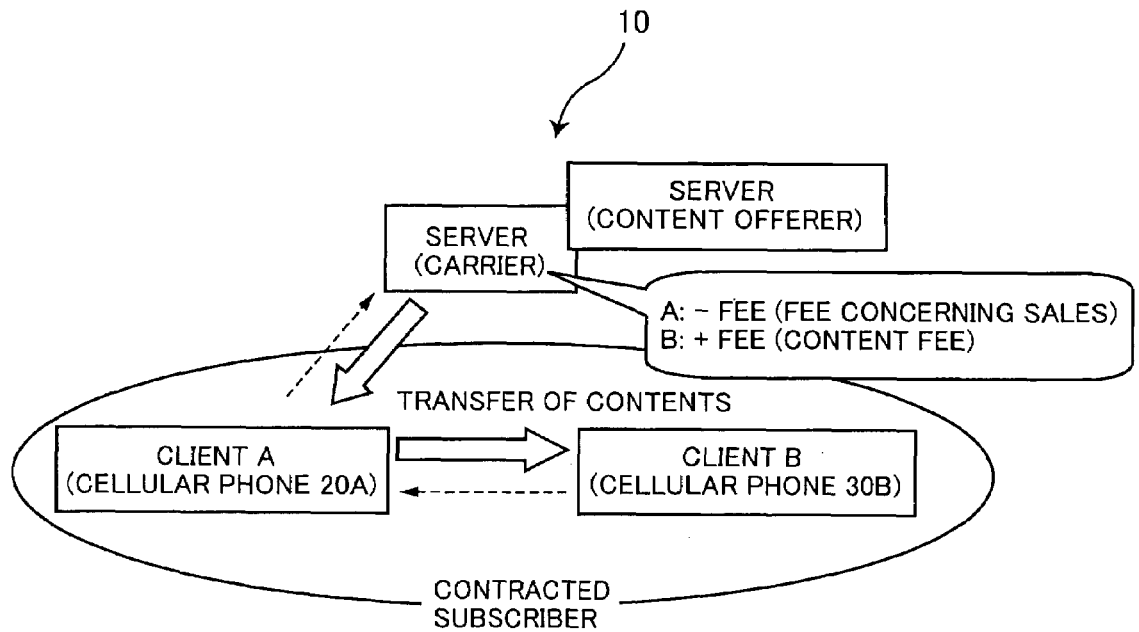
FIG. 1 shows a concept of a first communication system that realizes a first embodiment of a sending method of pay contents according to the present invention.
Figure 2:
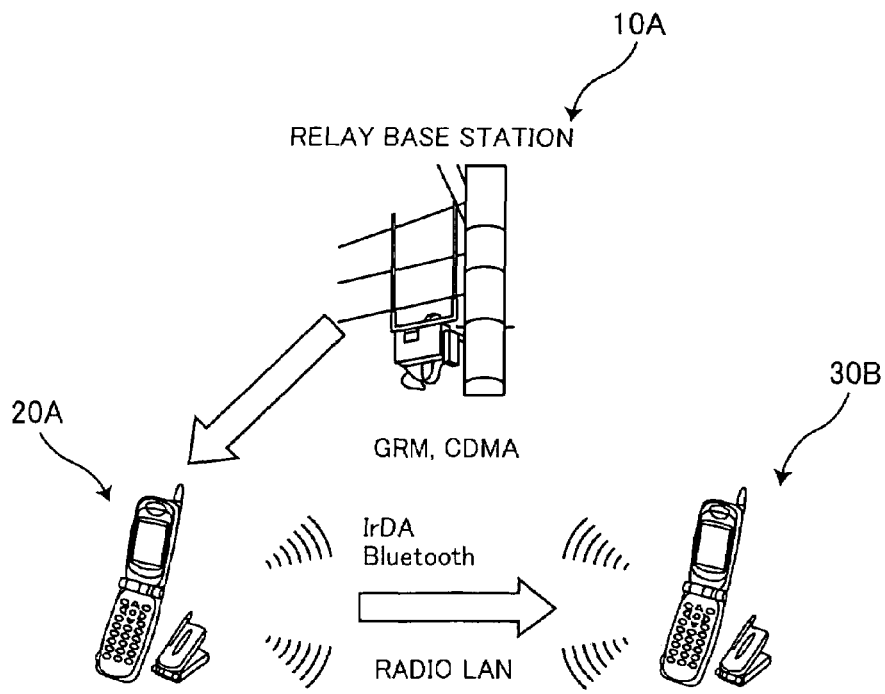
FIG. 2 shows a usage pattern of the first communication system shown in FIG. 1.

FIG. 1 shows a concept of a first communication system that realizes a first embodiment of a sending method of pay contents according to the present invention. FIG. 2 shows a usage pattern of the first communication system.

In a network system including a carrier and clients, the first communication system shown in the drawings contacts the clients on line. The first communication system includes a carrier which supplies contents to the clients, a client A of the clients which receives the contents, and a client B which receives the contents through the client A, and the first communication system charges a fee for that service against the client A and the client B at the carrier.

FIG. 1 shows a server 10 functioning as a carrier as well as a content provider, and clients A, B that are represented by two cellular phones 20A, 30B contracting the server 10.

As shown in FIG. 2, communication is carried out between a relay base station 10A which is corresponding to and is connected to the server 10, and the cellular phones 20A, 30B which are corresponding to the clients A, B using a normal radiotelephone communication scheme such as GRM, CDMA or the like. Between the cellular phones 20A, 30B, peer-to-peer communication is carried out using a communication scheme for peer-to-peer communication such as IrDa, bluetooth, wireless LAN, UWB or the like. Although only two units of cellular phones (clients) are indicated as a minimum structure, there are actually so many cellular phones (clients) that make a contract with a server 10. There are also many relay base stations 10A, which are corresponding to and under the umbrella of the server 10.

Here, the client A (cellular phone 20A) receives the pay contents from the carrier (server 10) which also functions as a content offerer, and the pay contents are sent from the client A (cellular phone 20A) to another client B (cellular phone 30B) by the peer-to-peer communication. This sending operation is carried out after the client A is permitted by the server 10 (carrier). If the client B (cellular phone 30B) receives the pay contents, the client B (cellular phone 30B) notifies the client A (cellular phone 20A) that the receiving operation was completed through the peer-to-peer communication, and client A reports to the server 10 the completion of the transfer operation of the pay contents to the client B (cellular phone 30B). Then, concerning the transfer of the pay contents, the server 10 (carrier) charges a minus fee as a transaction fee against the client A (pays the transaction fee to the client A), and charges the fee of the pay contents against the client B. In fact, the fee of the pay contents that the client A first bought from the server 10 is also charged separately, but attention is paid to the transfer of the contents from the client A to the client B.

In the communication system of the embodiment shown in FIGS. 1 and 2, four cases (2×2) of the following cases will be explained in succession:

(1a) the carrier offered to send contents to the client A (push), (1b) the client A requested the carrier to send contents (pull), (2a) the client A offered to send contents to the client B, and (2b) the client B requested the client A to send contents.

Figure 3:
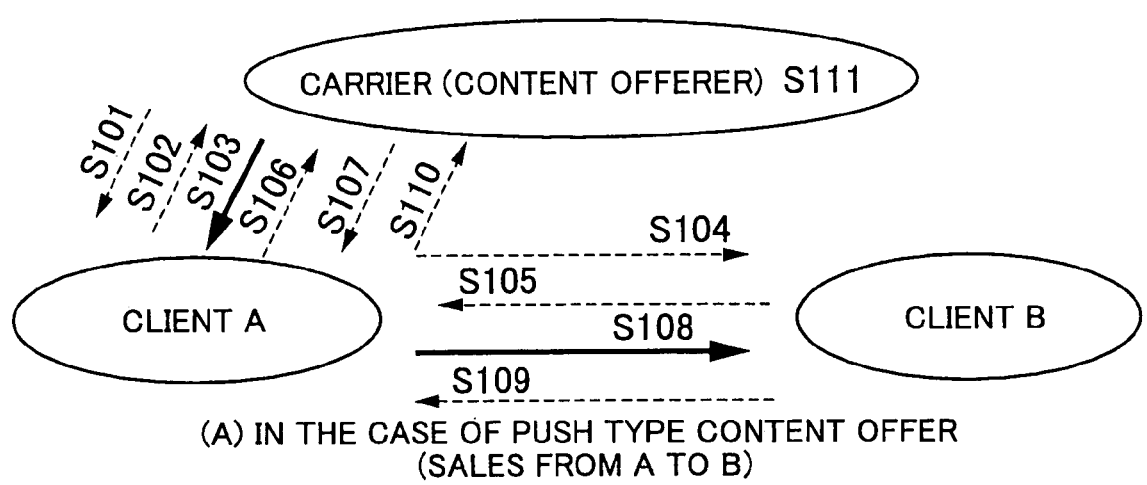
FIG. 3 is a schematic view of the communication system.
Figure 4:
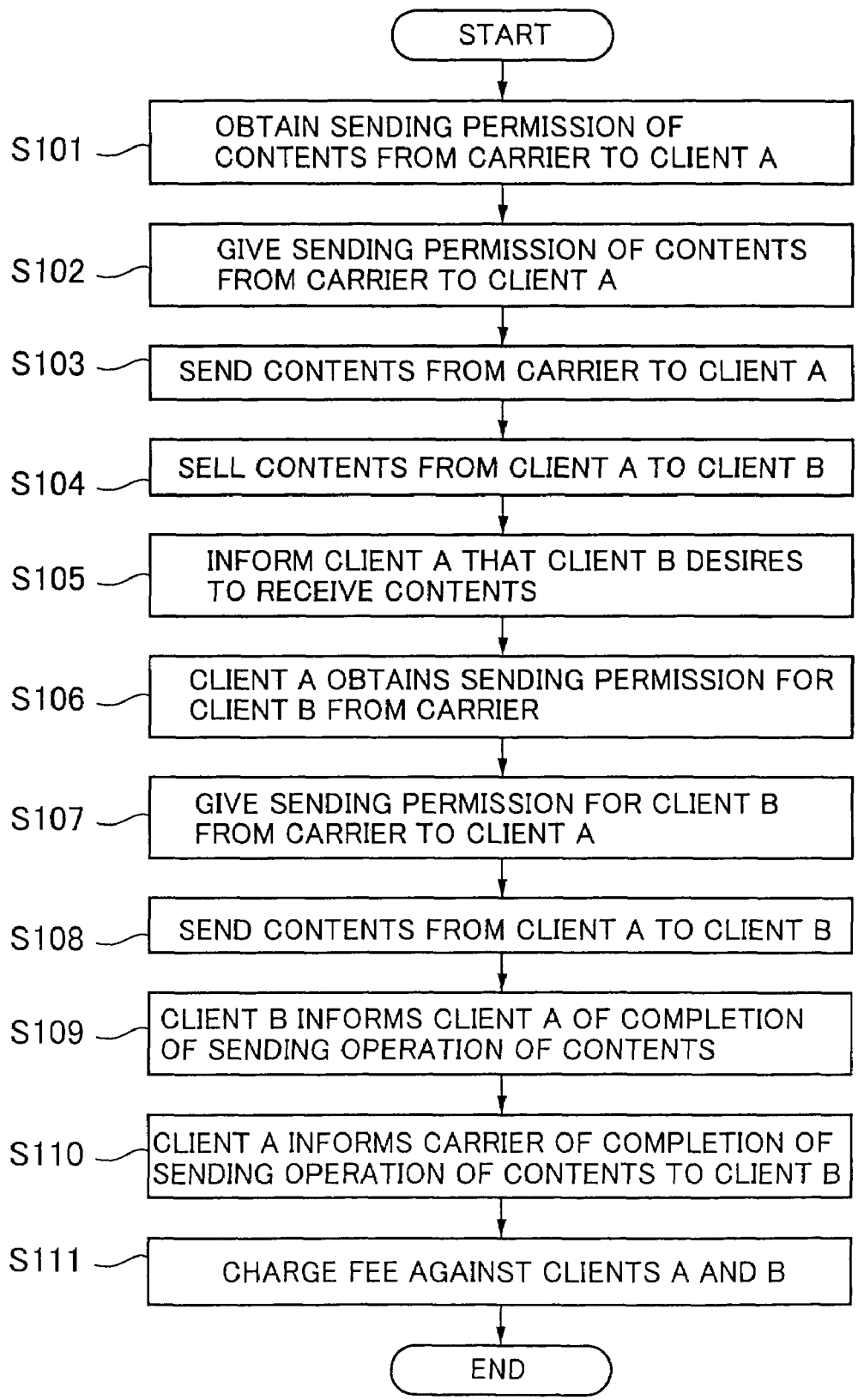
FIG. 4 is a flowchart showing a flow of communication.
Figure 5:
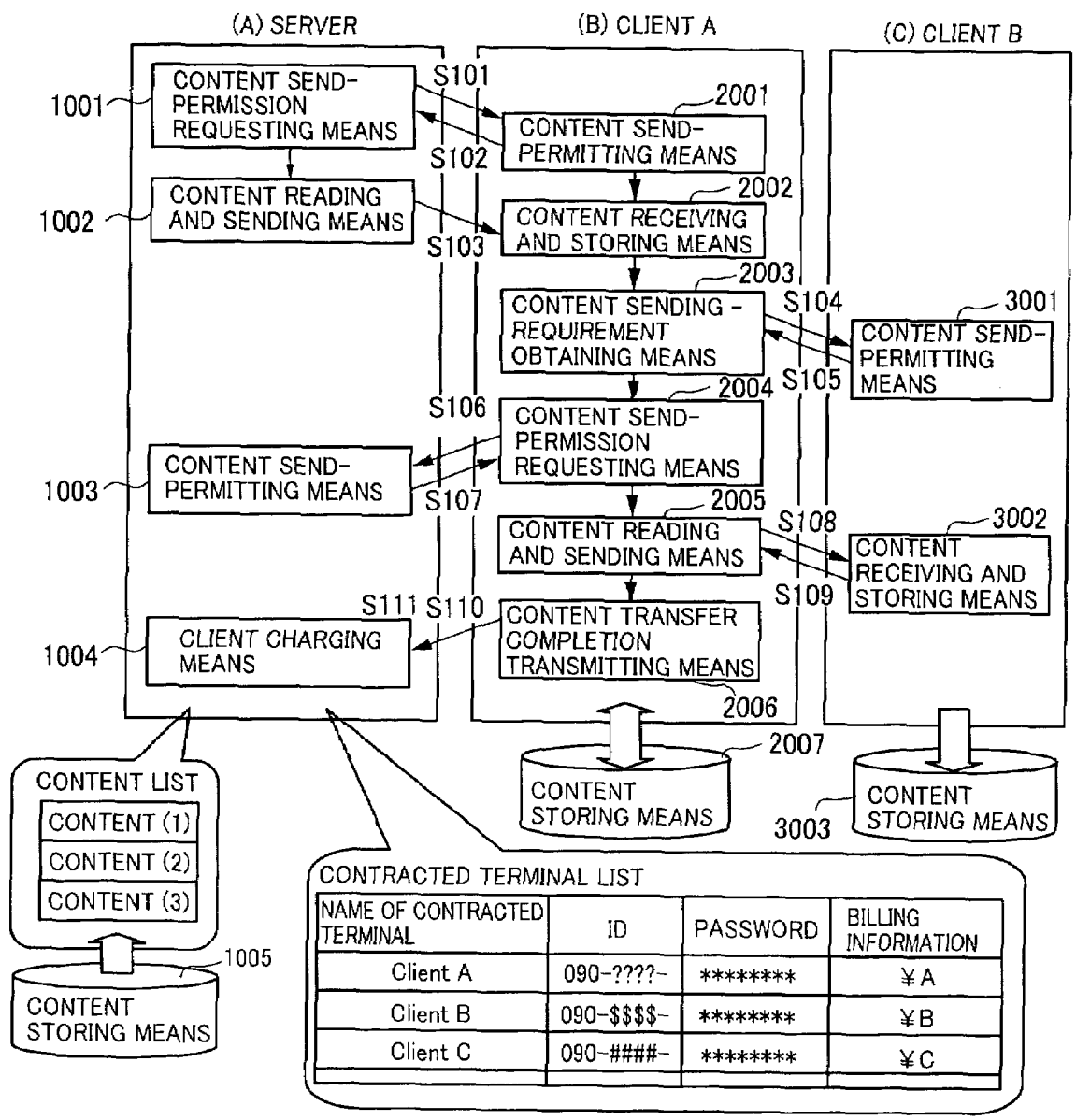
FIG. 5 is a functional block diagram showing a flow of communication.

FIGS. 3, 4 and 5 are a schematic view, a flowchart and a functional block diagram showing flows of communication when (1a) the carrier offered to send contents to the client A (push) and (2a) the client A offered to send contents to the client B.

In FIGS. 3 to 5, corresponding steps are designated with the same symbols (S101 to S111).

As shown in FIG. 5, (a) server includes content send-permission requesting means 1001, content reading and sending means 1002, content send-permitting means 1003, client charging means 1004 and content storing means 1005. Various contents shown in a content list are stored in the content storing means 1005. As shown in a contract terminal list in FIG. 5, information for managing all contracting clients is stored in the server. Charging information for each client is also included in this information. A managing company of the server periodically collects charges from the clients based on the charging information.

The client A (cellular phone 20A) of (b) includes content send-permitting means 2001, content receiving and storing means 2002, content sending-requirement obtaining means 2003, content send-permission requesting means 2004, content reading and sending means 2005, content transfer completion transmitting means 2006, and content storing means 2007.

The client B (cellular phone 30B) of (c) includes content send-permitting means 3001, content receiving and storing means 3002, and content storing means 3003.

Communication is carried out between the server and the client A through a normal radiotelephone line, and peer-to-peer communication is carried out between the client A and the client B.

Here, the content storing means 1005, the content storing means 2007 and the content storing means 3003 are shown outside frames of the (a) server, (b) client A and (c) client B for convenience, but they are constituent elements of the (a) server, (b) client A and (c) client B, respectively. The same can be said for each of the following examples.

First, the content send-permission requesting means 1001 of the server requests the content send-permitting means 2001 for permission of sending the contents (step S101), and the content send-permitting means 2001 of the client A permits the content send-permission requesting means 1001 to send the contents (step S102). The content reading and sending means 1002 of the server reads the required contents from the content storing means 1005, and sends the contents to the client A (step S103). The client A receives the contents sent from the server using the content receiving and storing means 2002, and stores the same in the content storing means 2007.

Next, the client A sells the contents to the client B by means of the content sending-requirement obtaining means 2003 (step S104). In response to receipt of the sales offer from client A by means of the content send-permitting means 3001, if the client B desires to receive the contents, the client B informs the content sending-requirement obtaining means 2003 of the client A to that effect (step S105).

Then, the client A requests the server to permit the transfer of the contents to the client B by means of the content send-permission requesting means 2004 (step S106). The server receives the request by means of the content send-permitting means 1003, and permits the content send-permission requesting means 2004 of the client A to transfer the contents to the client B (step S107). Then, the client A reads the required contents from the content storing means 2007 by means of the content reading and sending means 2005, and sends the same to the client B (step S108). The client B receives the sent contents by means of the content receiving and storing means 3002, and stores the same in the content storing means 3003, and notifies the content reading and sending means 2005 of the completion of the receipt (step S109). The client A receives the notification of the receipt completion from the client B, and reports the server that the transfer of the contents to the client B is completed by means of the content transfer completion transmitting means 2006 (step S110).

In the server 10, the transfer completion notification is sent to the client charging means 1004, and the client charging means charges fees against the clients A, B (step S111).

Figure 6:
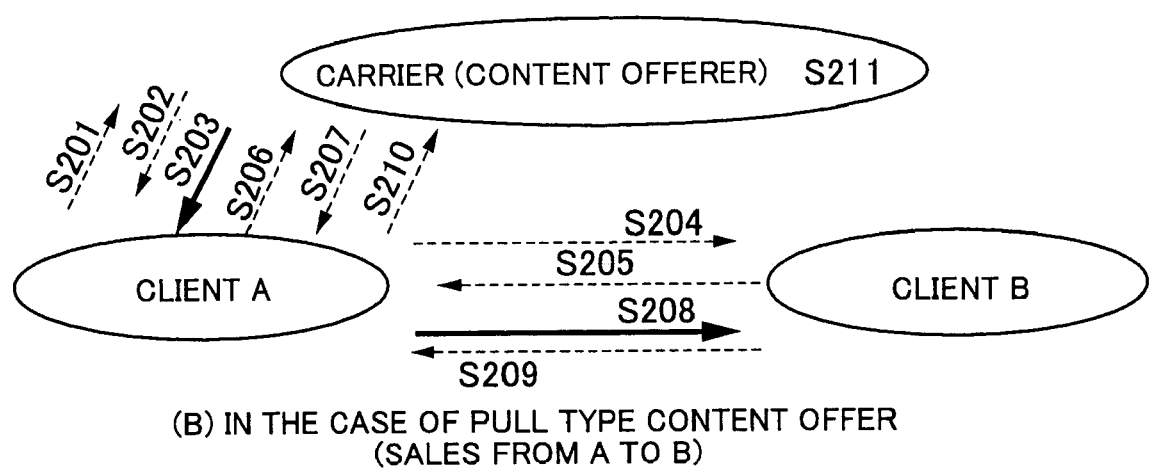
FIG. 6 is a schematic view of the communication system showing a flow of communication.
Figure 7:
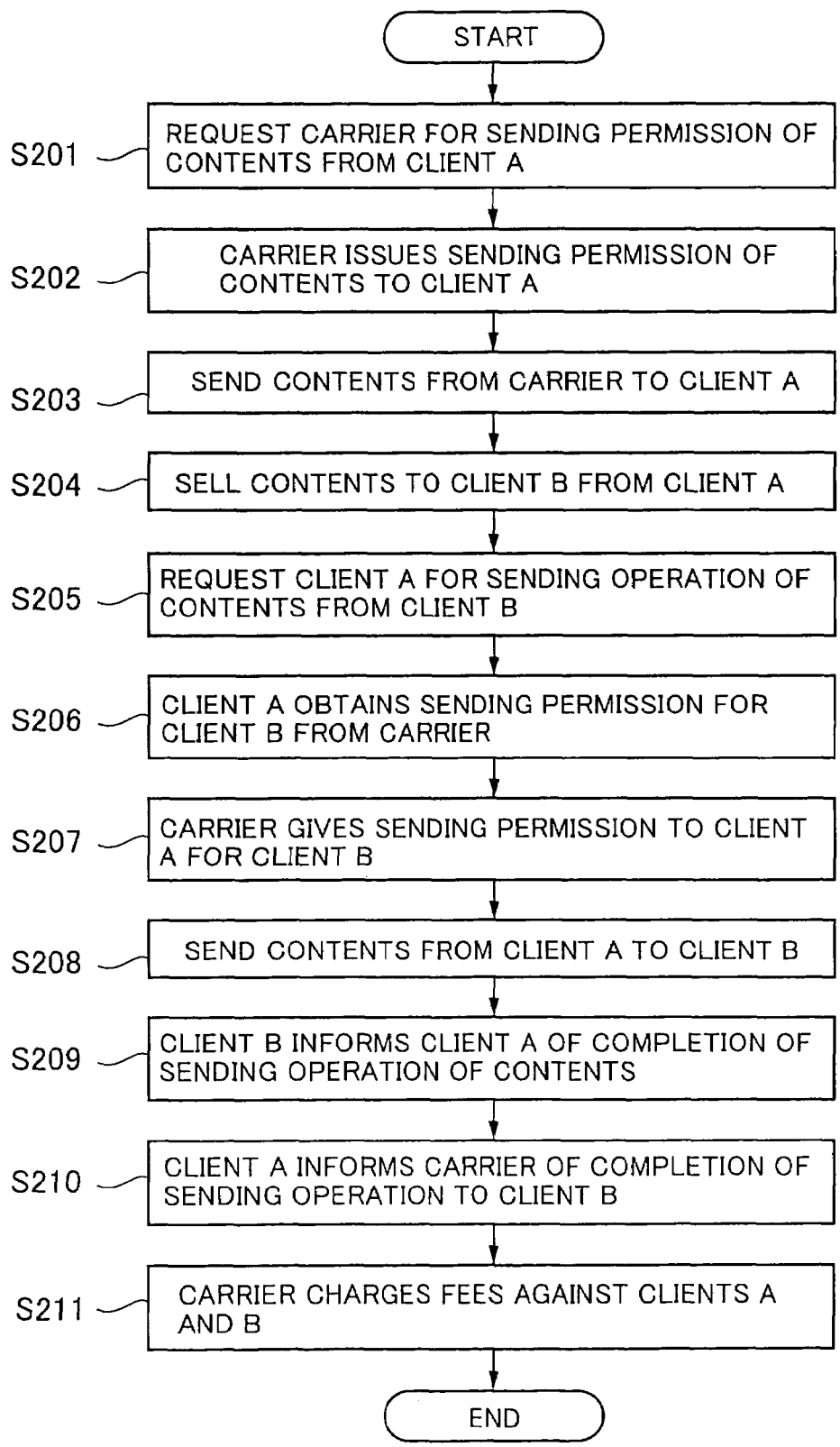
FIG. 7 is a flowchart showing a flow of communication.
Figure 8:
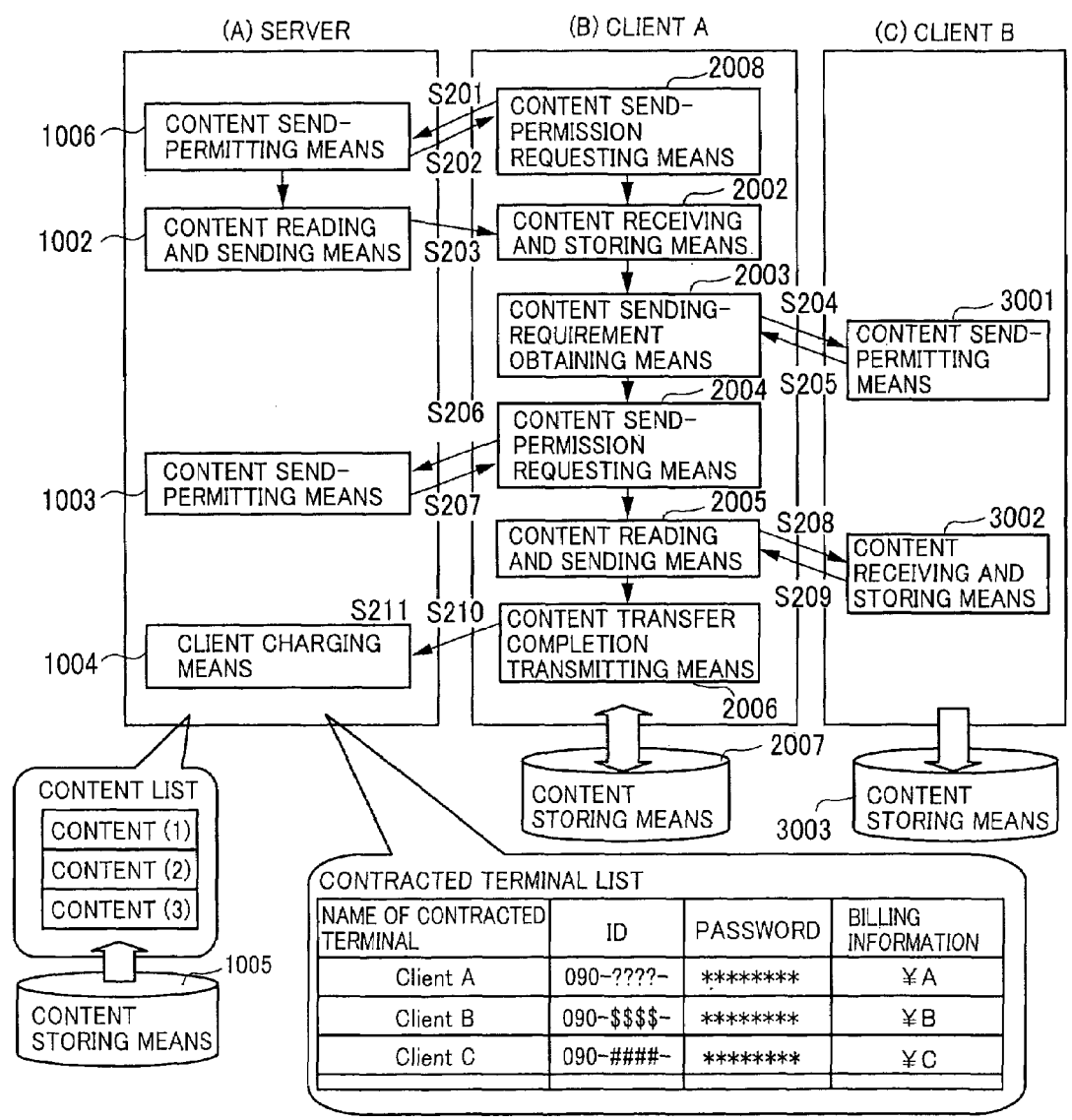
FIG. 8 is a functional block diagram showing a flow of communication.

FIGS. 6 to 8 are respectively a schematic view of the communication system, a flowchart and a functional block diagram showing flows of communication when (1b) the client requested the carrier to send contents (pull), and (2a) the client A offered to send contents to the client B.

In FIGS. 6 to 8, corresponding steps are designated with the same symbols (S201 to S211). Here, differences with respect to FIGS. 3 to 5 will be explained.

In this example, as shown in FIG. 8, the server includes content send-permitting means 1006 instead of the content send-permission requesting means 1001 shown in FIG. 5, and the client A includes content send-permission requesting means 2008 instead of the content send-permitting means 2001 shown in FIG. 5.

First, the content send-permission requesting means 2008 of the client A requests the server to send contents (step S201) The server receives the request by means of the content send-permitting means 1006, permits the content send-permission requesting means 2008 of the client A to send the contents (step S202), the content reading and sending means 1002 reads the requested contents from the content storing means 1005, and sends the contents to the client A (step S203). Subsequent steps S204 to 211 are the same as steps S104 to 111 and thus, explanation thereof will be omitted.

Figure 9:
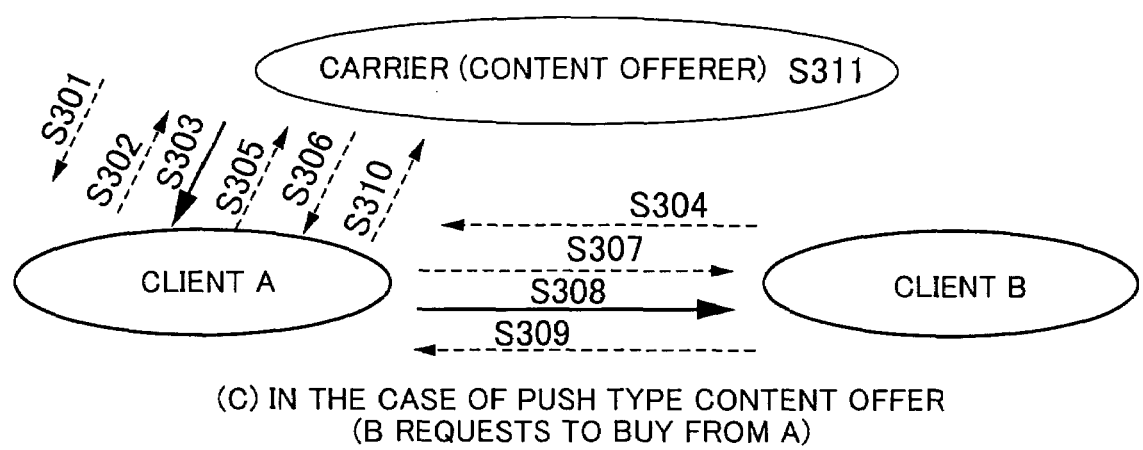
FIG. 9 is a schematic view of the communication system showing a flow of communication.
Figure 10:
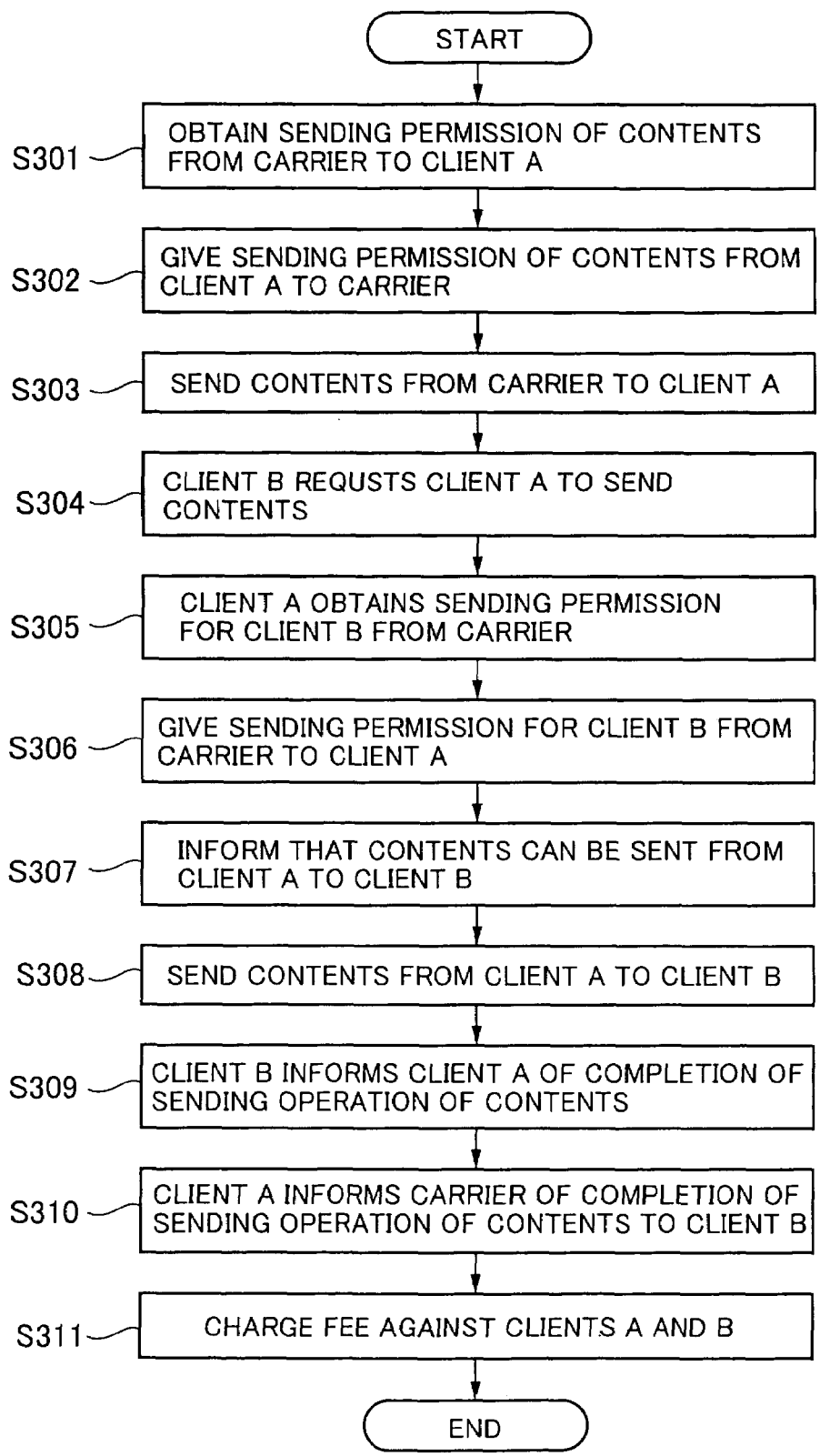
FIG. 10 is a flowchart showing a flow of communication.
Figure 11:
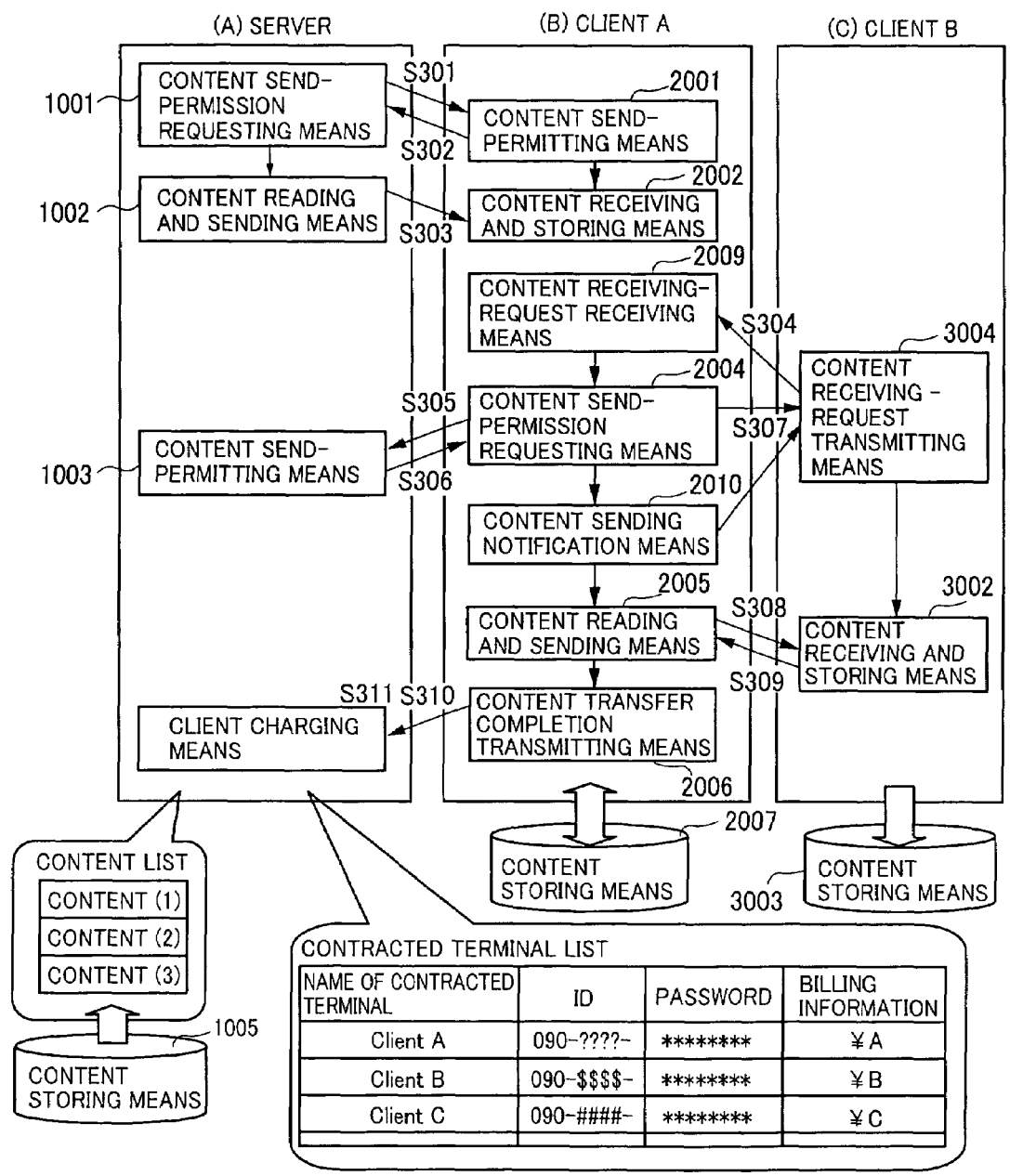
FIG. 11 is a functional block diagram showing a flow of communication.

FIGS. 9 to 11 are respectively a schematic view of the communication system, a flowchart and a functional block diagram showing flows of communication when (1a) the carrier offered to send contents to the client A (pull), and (2a) the client B requested the client A to send contents.

In FIGS. 9 to 11, corresponding steps are designated with the same symbols (S301 to S311). Here, differences with respect to FIGS. 3 to 5 will be explained.

In this example, as shown in FIG. 11, the client A includes content receiving-request receiving means 2009 and content sending notification means 2010 instead of the content sending-requirement obtaining means 2003 in the example shown in FIG. 5. The client B includes content receiving request transmitting means 3004 instead of the content send-permitting means 3001 shown in FIG. 5.

In the example shown here, steps S301 to 303 are the same as steps S101 to 103 and thus, explanation thereof will be omitted.

In step S304, the content receiving request transmitting means 3004 of the client B requests the content receiving-request receiving means 2009 of the client A to send contents (step S304). Then the content send-permission requesting means 2004 of the client A contacts the content send-permitting means 1003 of the server and receives permission to send the contents to the client B (steps S305 and 306 which are the same as steps 106 and 107 of the example shown in FIGS. 3 to 5). The content sending notification means 2010 informs the content receiving request transmitting means 3004 of the client B that the contents can be sent (step S307).

Subsequent steps S308 to 311 are the same as steps S108 to 111 and thus, explanation thereof will be omitted.

Figure 12:
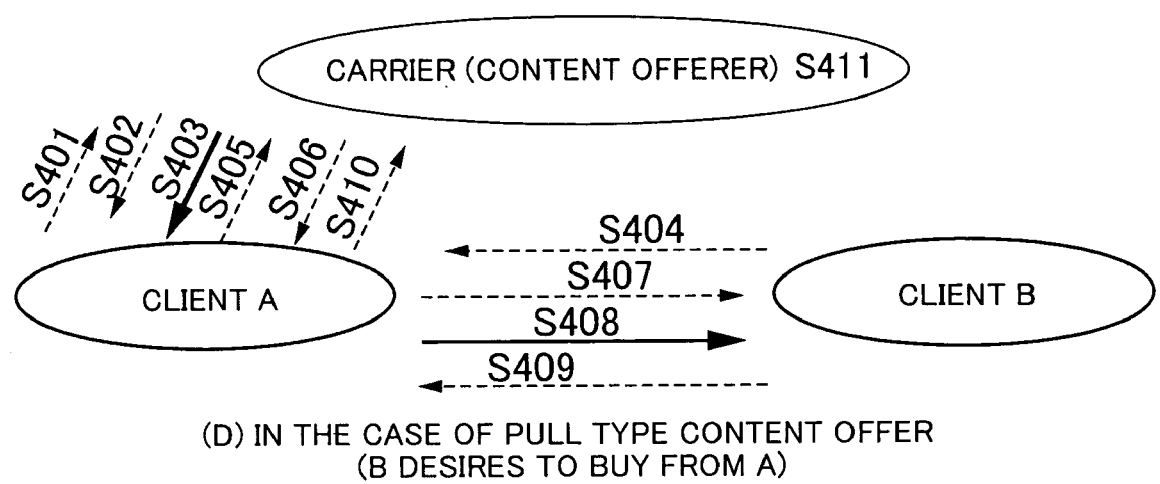
FIG. 12 is a schematic view of the communication system showing a flow of communication.
Figure 13:
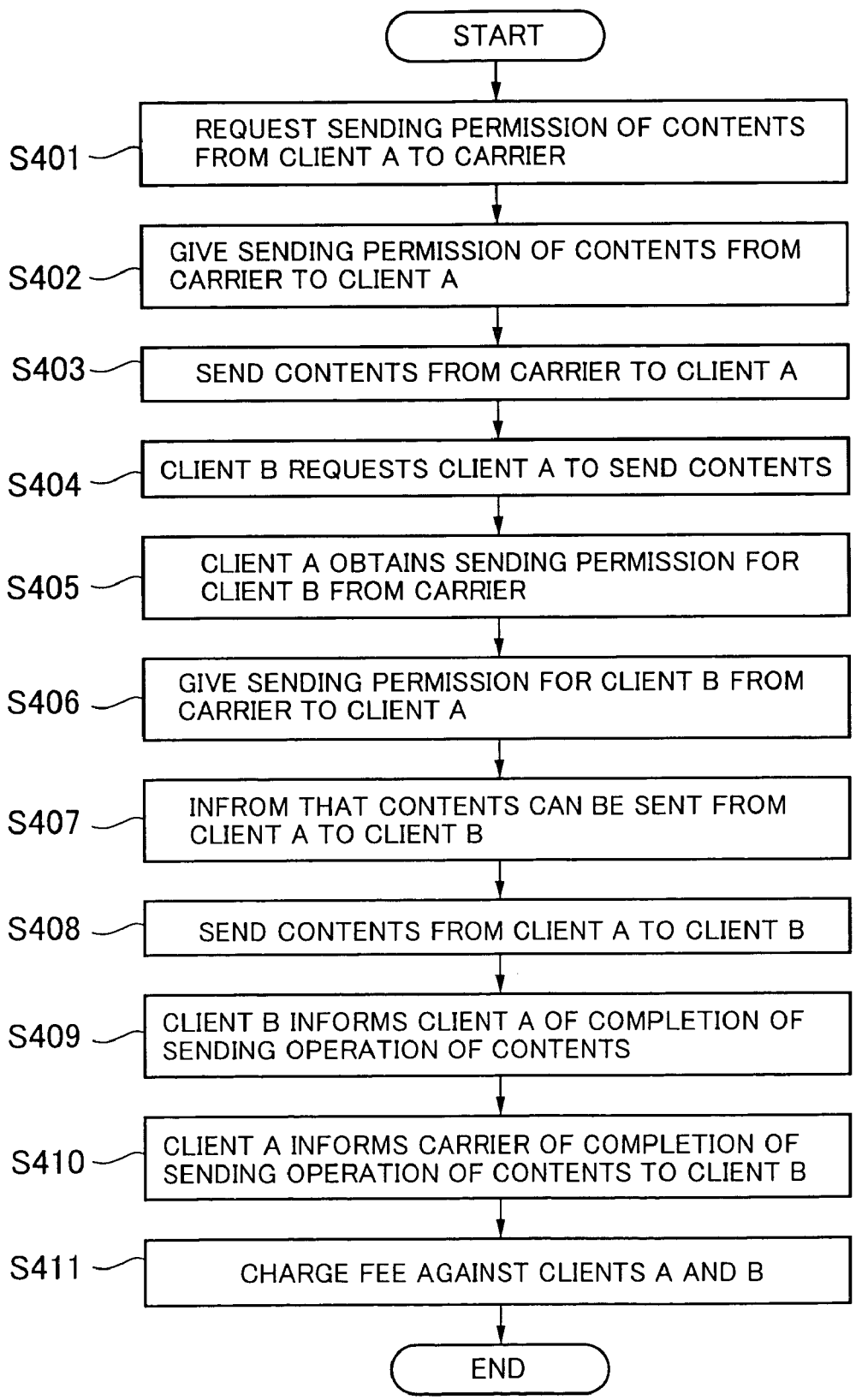
FIG. 13 is a flowchart showing a flow of communication.
Figure 14:
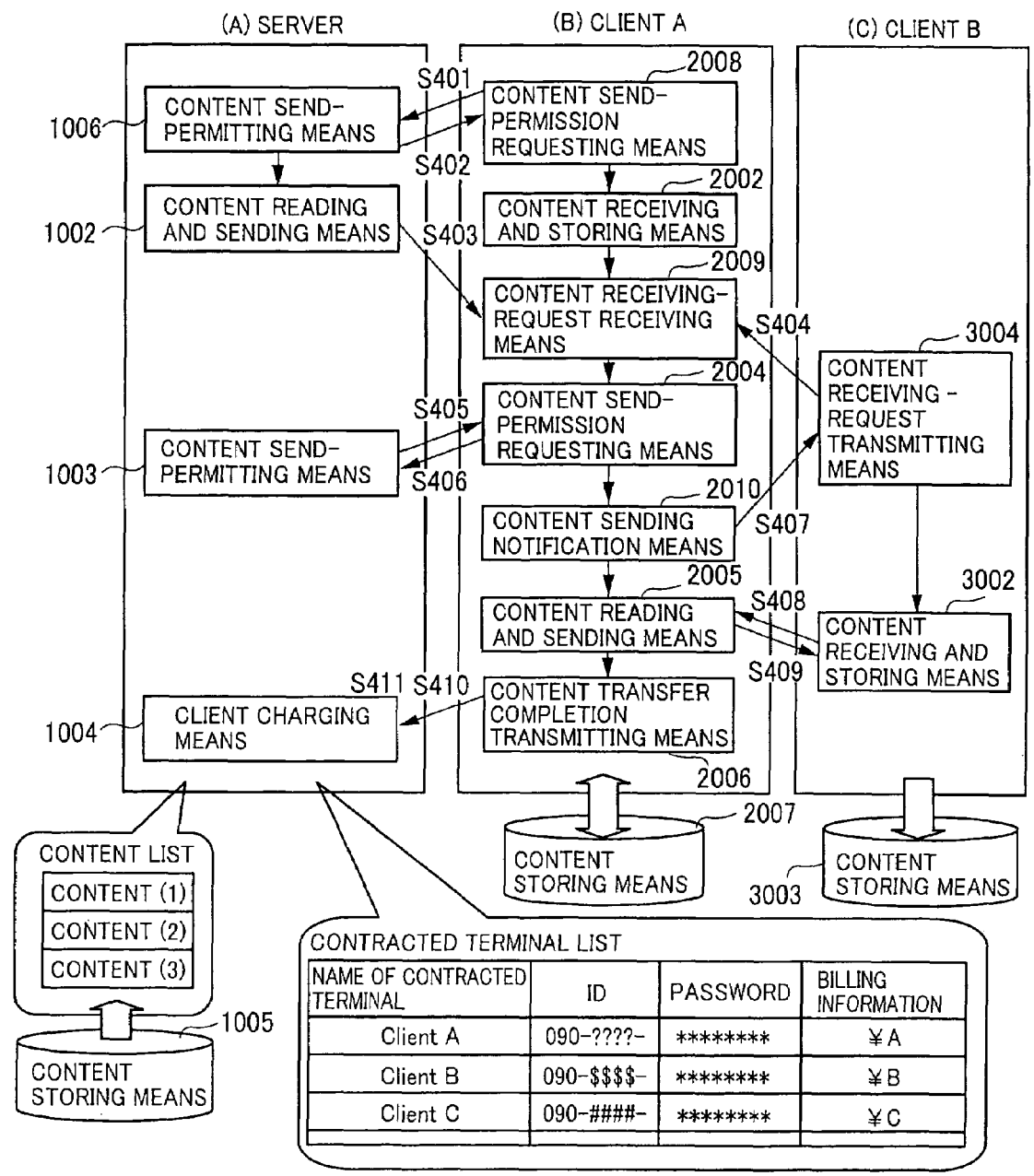
FIG. 14 is a functional block diagram showing a flow of communication.

FIGS. 12 to 14 are respectively a schematic view of the communication system, a flowchart and a functional block diagram showing flows of communication when (1b) the client A requested the carrier to send contents (pull), and (2b) the client B requested the client A to send contents.

In FIGS. 12 to 14, corresponding steps are designated with the same symbols (S401 to S411).

Steps S401 to 403 are the same as steps S201 to 203 in the example shown in FIGS. 6 to 8, and steps S404 to 411 are the same as steps S304 to 311 in the example shown in FIGS. 9 to 11 and thus, explanation thereof will be omitted.

Figure 15:
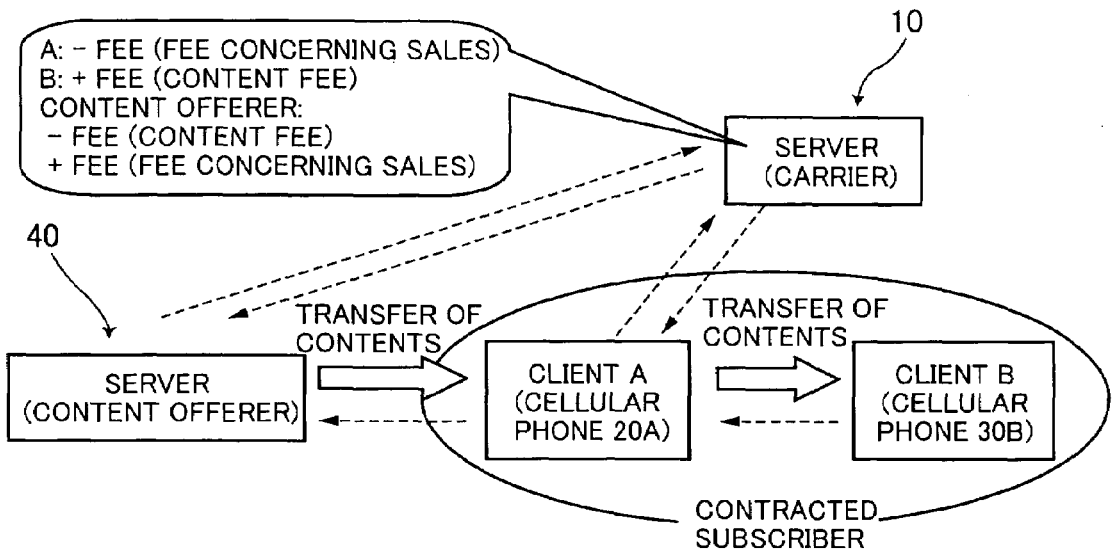
FIG. 15 shows a concept of a second communication system that realizes a second embodiment of a sending method of pay contents according to the invention.
Figure 16:
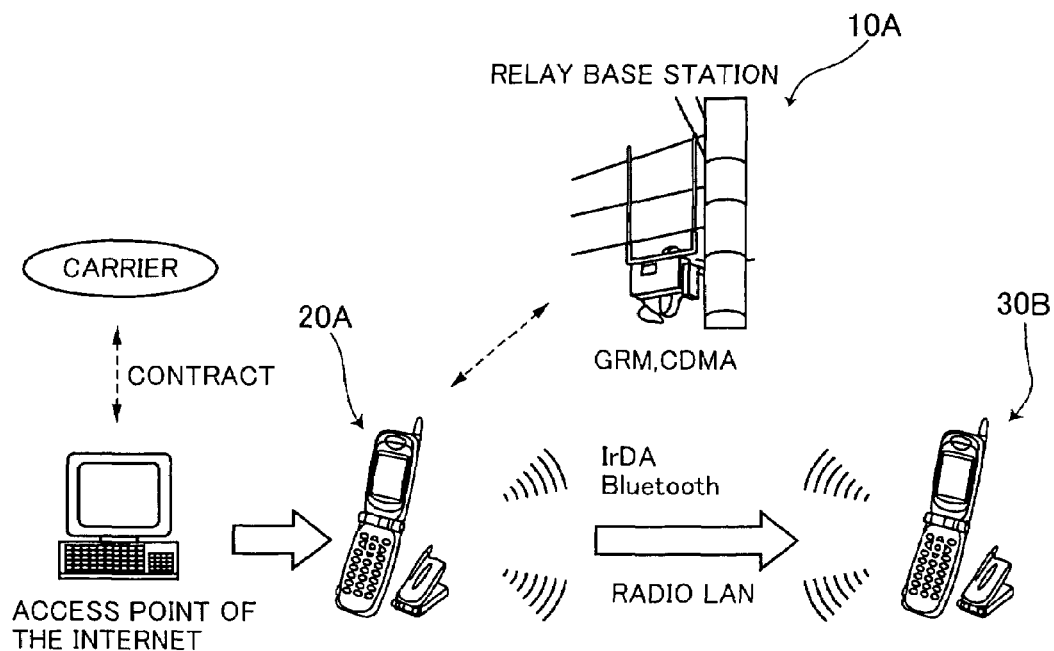
FIG. 16 shows a usage pattern of the second communication system shown in FIG. 15.

FIG. 15 shows a concept of a second communication system that realizes a second embodiment of a sending method of pay contents according to the present invention. FIG. 16 shows a usage pattern of the second communication system.

In a network including a carrier, a content offerer and clients, the second communication system contracts the clients on line, and contracts the content offerer. The second communication system includes the carrier which contracts clients using ad hoc connection between the clients, a content supplier which supplies contents to the clients, a client A of the clients who receives the contents, and a client B who receives the contents through the client A. If the contents are supplied from the content supplier to the client B through the client A, the second communication system charges fees against the clients A, B and the content supplier by means of the carrier.

In the second communication system, the server 10 functions as the carrier, but a server 40 which functions as the content offerer is provided independently from the server 10.

As shown in FIG. 16, the client A accesses a predetermined access point on the internet line by contract with the carrier (server 10), and can obtain desired contents from the server 40 through the Internet by buying from the server 40 having the content offerer or by requesting by himself or herself (client A). Here, a personal computer shown in FIG. 16 obtains the desired contents through the Internet, and the contents are transferred from the personal computer to the portable terminal 20A through the peer-to-peer communication.

The personal computer and the cellular phone 20A shown in FIG. 16 are corresponding to the client A.

Alternatively, instead of the client A shown in FIG. 16, the personal computer may access the predetermined access point, and the cellular phone 20A may receive the contents directly from the relay base station 10A. Alternatively, the cellular phone 20A itself may access the access point.

The carrier (server 10) and the content offerer (server 40) frequently make contact with each other, the carrier (server 10) always informs the content offerer (server 40) of latest information concerning a subscriber (contractor) to this system, and whenever the content offerer (server 40) sends the contents to the client, the carrier (server 10) is informed of which client receives which contents.

Like the first communication system shown in FIGS. 1 and 2, the client A (cellular phone 20A) transfers the contents to the client B (cellular phone 30B) through the peer-to-peer communication, but the client A (cellular phone 20A) transfers the contents after being permitted by the server 10 (carrier), and if the client B (cellular phone 30B) receives the contents, the client A (cellular phone 20A) is informed of the completion of receipt, and the client A reports the carrier (server 10) that the transfer is completed. Then, the carrier (server 10) charges a minus fee against the client A and refunds the transaction fee, charges a fee of the contents against the client B, and pays the fee of the contents by the minus fee to the content offerer, and charges the transaction fee (the transaction fee to be paid to the client A+profit of the carrier).

Like the case of the first communication system shown in FIGS. 1 and 2, a fee of contents that the client A first purchased from the server 40 is charged, but here, the billing when the client A transfers the contents to the client B is shown.

In the second communication system of the embodiment shown in FIGS. 15 and 16, four cases (2×2) of the following cases will be explained in succession:

(1a) the content offerer offered to send contents to the client A (push), (1b) the client A requested the content offerer to send contents (pull), (2a) the client A offered to send contents to the client B, and (2b) the client B requested the client A to send contents.

Only different portions from that explained in the previous example will be explained for convenience.

Figure 17:
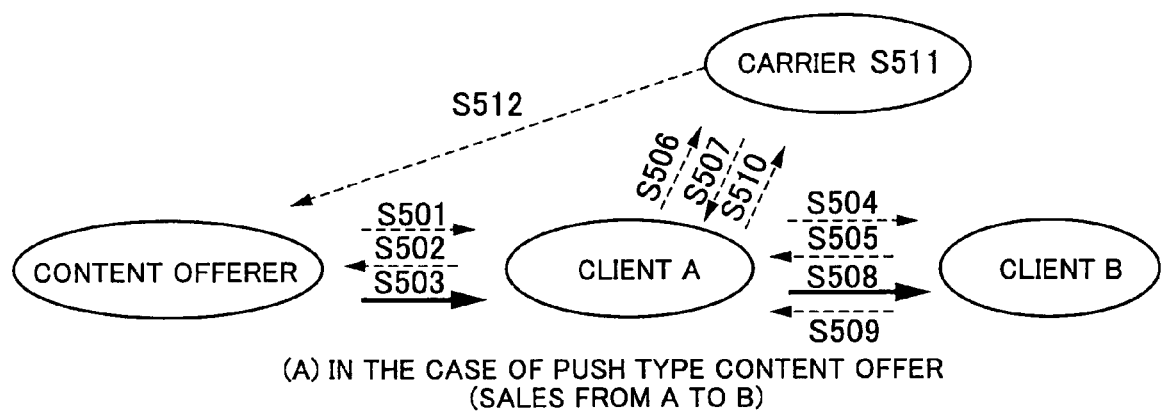
FIG. 17 is a schematic view of the communication system.
Figure 18:
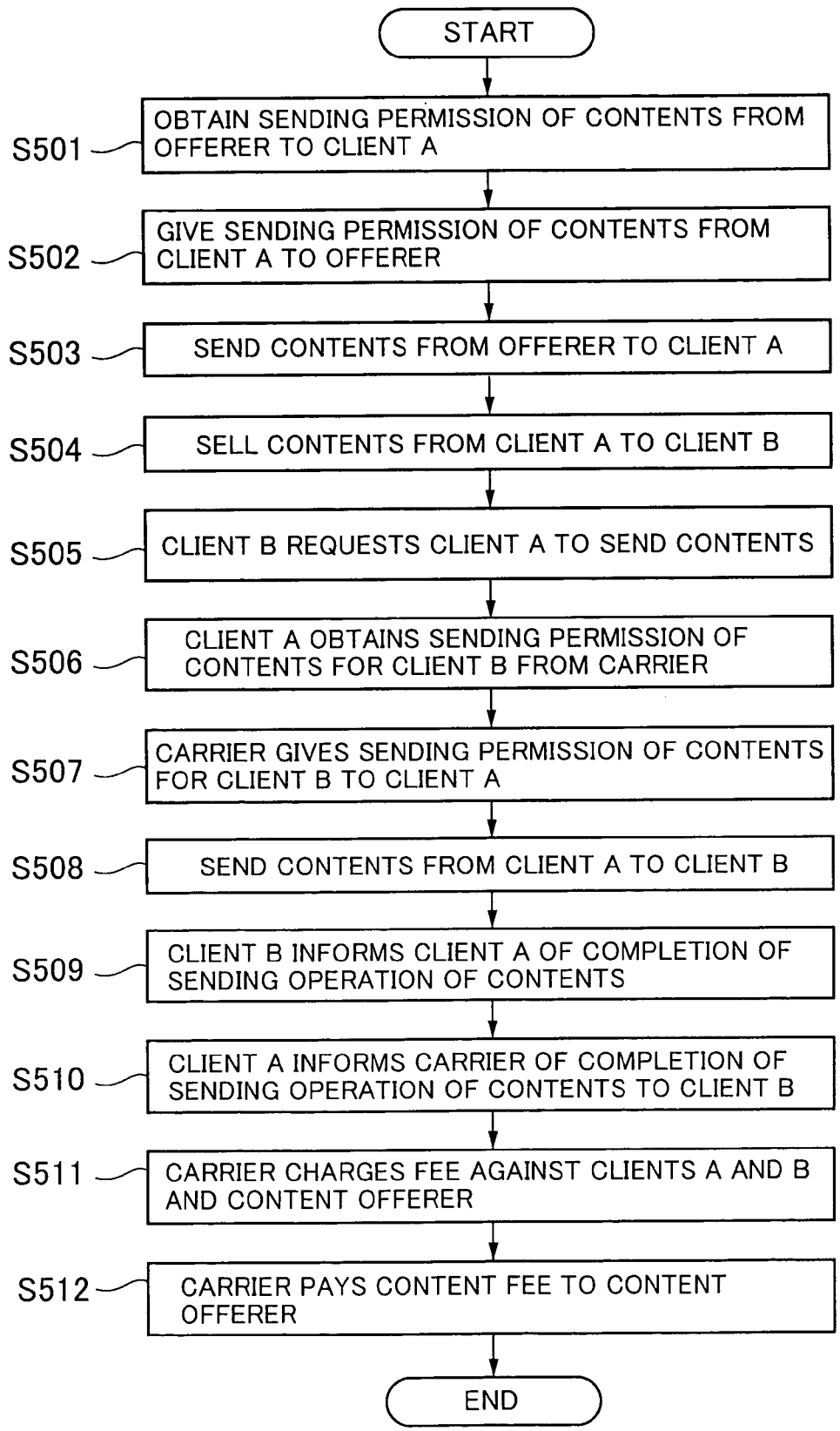
FIG. 18 is a flowchart showing a flow of communication.
Figure 19:
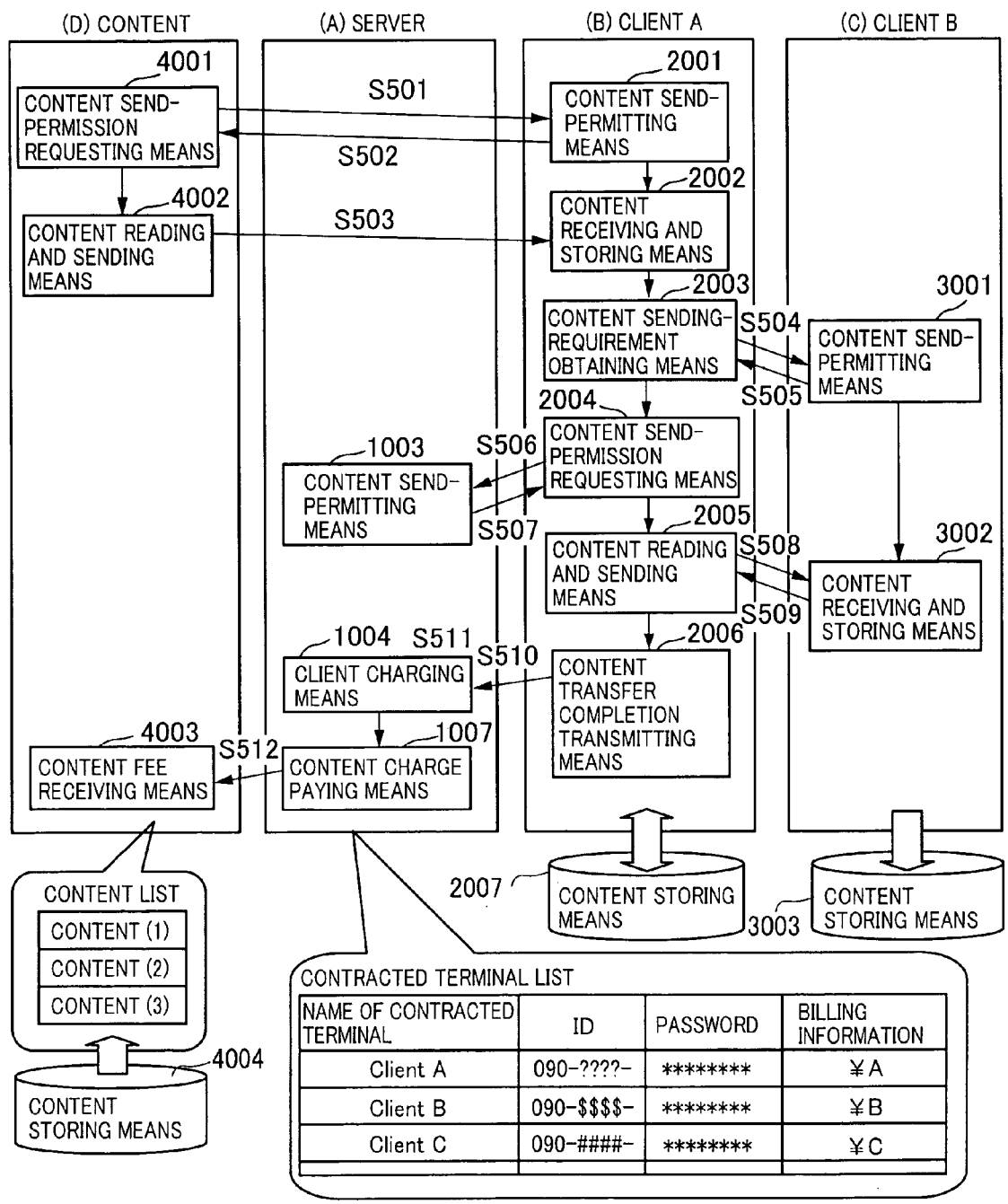
FIG. 19 is a functional block diagram showing a flow of communication.

FIGS. 17 to 19 are respectively a schematic view of the communication system, a flowchart and a functional block diagram showing flows of communication when (1a) the content offerer offered to send contents to the client A (push), and (2a) the client A requested the client B to send contents, In FIGS. 17 to 19, corresponding steps are designated with the same symbols (S501 to S512).

In FIG. 19, (d) contents mean the server 40 on the side of the content offerer shown in FIG. 15. In FIG. 19, (d) is called contents so as to distinguish it from the server (server 10 of the carrier shown in FIG. 15) of (a) in FIG. 19.

The (d) contents in FIG. 19 include content send-permission requesting means 4001, content reading and sending means 4002, contents fee receiving means 4003 and content storing means 4004. In the example explained with reference to FIGS. 3 to 5, as shown in FIG. 5, the content send-permission requesting means 1001, the content reading and sending means 1002 and the content storing means 1005 which respectively correspond to the content send-permission requesting means 4001, the content reading and sending means 4002 and the content storing means 4004 of the contents (d) in FIG. 19 are included in (a) server. In the example shown here, the content send-permission requesting means 4001, the content reading and sending means 4002 and the content storing means 4004 are included in the (d) contents for sharing a roll with the (a) server.

In FIG. 19, (a) server does not include the content send-permission requesting means 1001, the content reading and sending means 1002 and the content storing means 1005 which are included in (a) server in FIG. 5. The (a) server in FIG. 19 includes the content send-permitting means 1003 and the client charging means 1004 which are the same constituent elements as those of the (a) server in FIG. 5, and further includes contents charge paying means 1007.

The constituent elements of the (b) client A in FIG. 19 are the same as those of the example of the (b) client A in FIG. 5 except that the communication partner is changed from the (a) server to (d) contents. The structure of the (c) client B in FIG. 19 is the same as that of the (c) client B in FIG. 5.

First, the content send-permission requesting means 4001 of the (d) contents requests the content send-permitting means 2001 of the client A for permission of sending contents (step S501), and the content send-permitting means 2001 of the client A permits the content send-permission requesting means 4001 of the contents to send the contents (step S502). Then, the content reading and sending means 4002 of the (d) contents reads the requested contents from the content storing means 4004, and sends the contents to the client A (step S503). The client A receives the contents sent from (d) contents by means of the content receiving and storing means 2002, and stores the same in the content storing means 2007.

Subsequent steps S504 to 510 are the same as steps S104 to 111 in the example shown in FIGS. 3 to 5 and thus, explanation thereof will be omitted.

In step S511, the client charging means 1004 charges a fee like in step Sl11 in the example shown in FIGS. 3 to 5, and a charging operation against the (a) server (content offerer shown in FIG. 5) is also included, and this point is different from step S111.

In step S512, the contents charge paying means 1007 of the (a) server pays the content fee (transaction fee subtracted from content fee) to the (d) contents, and the paid content fee is received by the contents fee receiving means 4003 of the (d) contents. The payments of the content fees are made in terms of data, and actual settlement of payments is made at a later date, e.g., on the same day every month.

Figure 20:
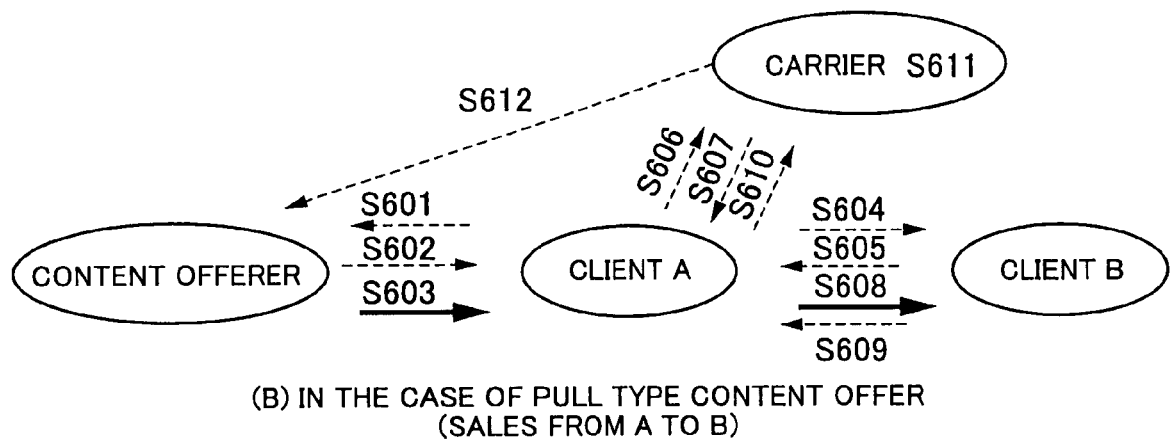
FIG. 20 is a schematic view of the communication system showing a flow of communication.
Figure 21:
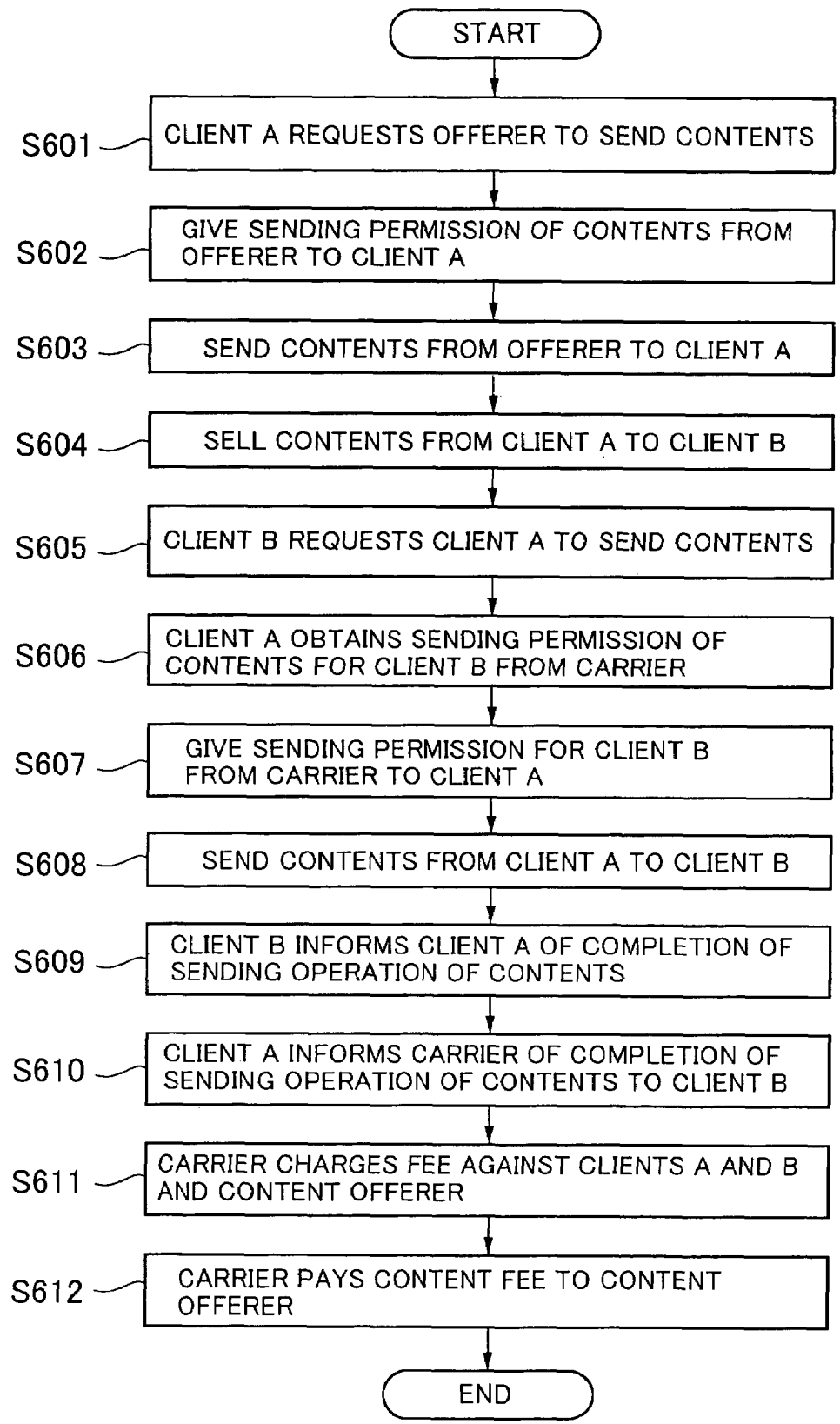
FIG. 21 is a flowchart showing a flow of communication.
Figure 22:
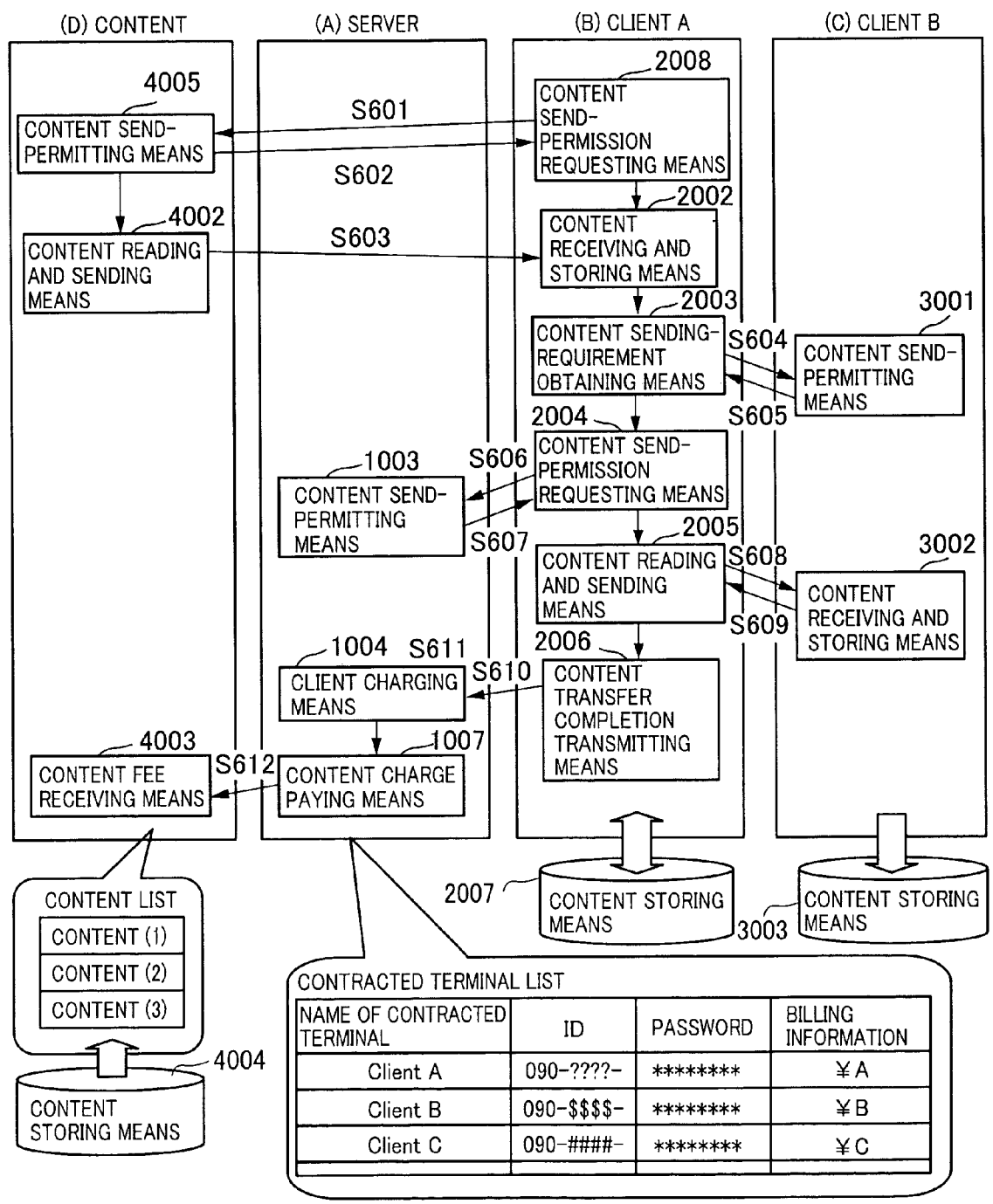
FIG. 22 is a functional block diagram showing a flow of communication.

FIGS. 20 to 22 are respectively a schematic view of the communication system, a flowchart and a functional block diagram showing flows of communication when (1b) the client A requested the content offerer to send contents (pull), and (2a) the client A offered to send contents to the client B.

In FIGS. 20 to 22, corresponding steps are designated with the same symbols (S601 to S612). Different portions from those of the example shown in FIGS. 17 to 19 will be explained.

In the example shown here, as shown in FIG. 22, the (d) contents include content send-permitting means 4005 instead of the content send-permission requesting means 4001 shown in FIG. 19, and the client A includes the content send-permission requesting means 2008 instead of the content send-permitting means 2001 shown in FIG. 19.

First, the content send-permission requesting means 2008 of the client A requests the (d) contents to send contents (step S601). The (d) contents receives the request by means of the content send-permitting means 4005, sends back the permission to the content send-permission requesting means 2008 of the client A (step S602), the content reading and sending means 4002 reads the requested contents from the content storing means 4004, and sends the contents to the client A (step S603).

Subsequent steps S604 to 612 are the same as steps S504 to 512 in the example shown in FIGS. 17 to 19 and thus, explanation thereof will be omitted.

Figure 23:
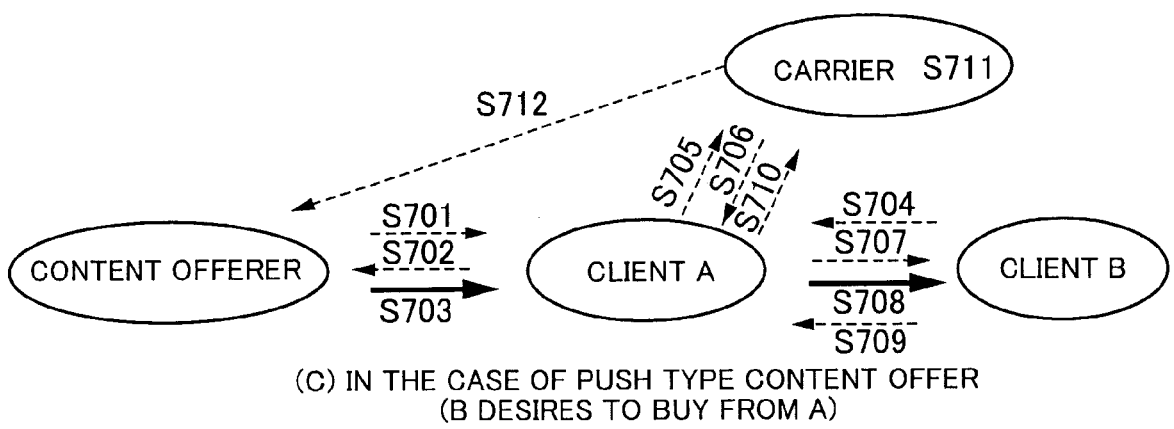
FIG. 23 is a schematic view of the communication system showing a flow of communication.
Figure 24:
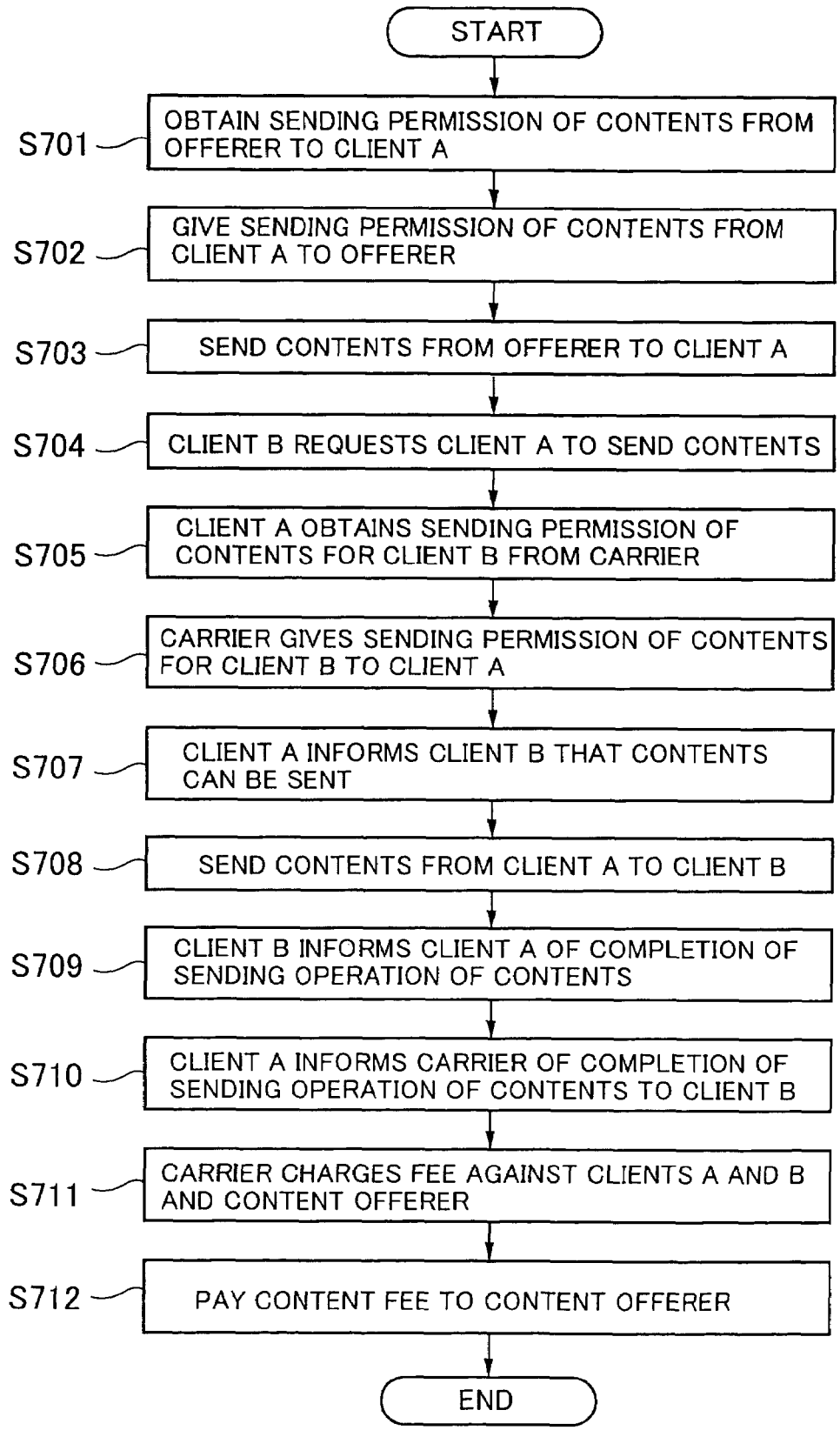
FIG. 24 is a flowchart showing a flow of communication.
Figure 25:
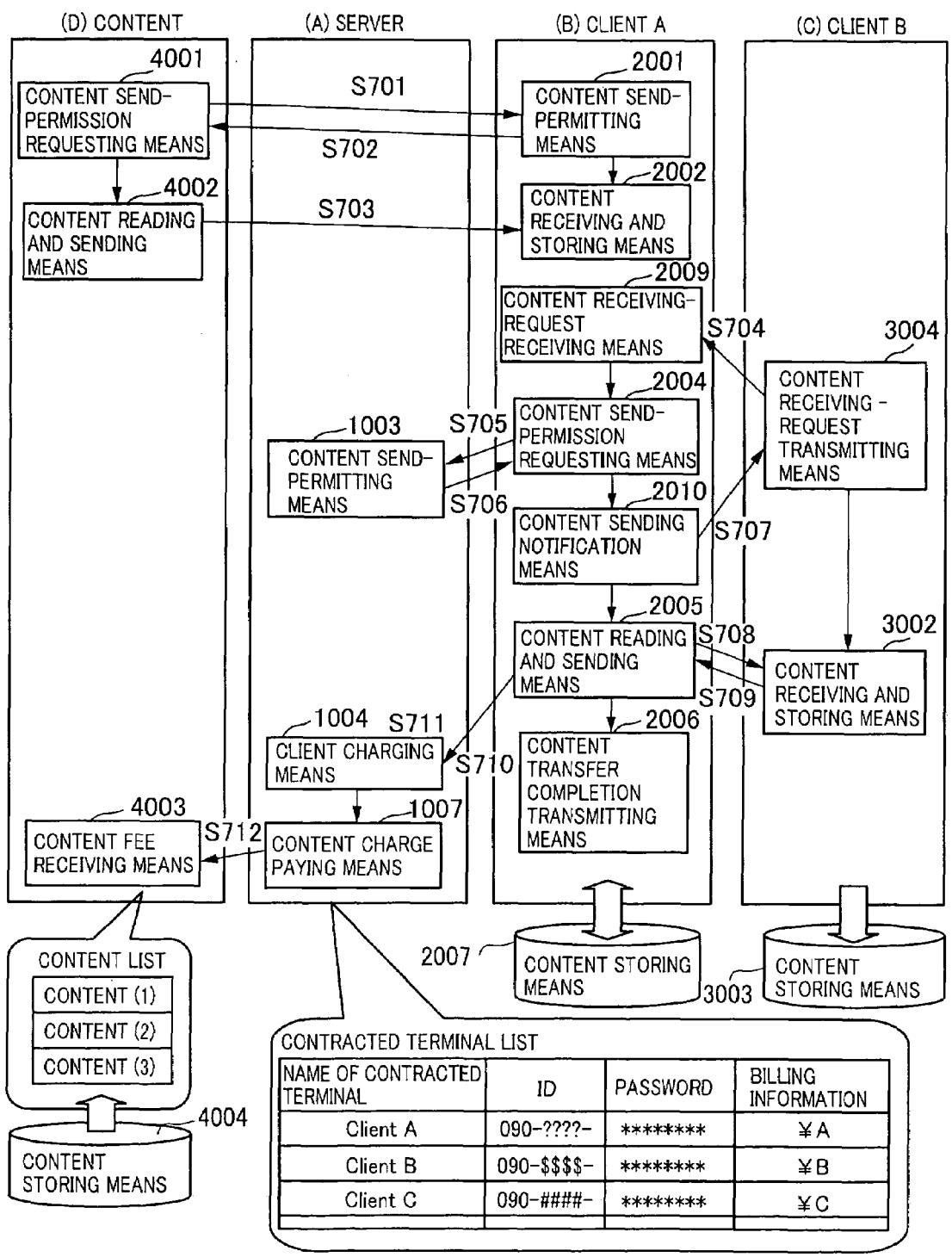
FIG. 25 is a functional block diagram showing a flow of communication.

FIGS. 23 to 25 are respectively a schematic view of the communication system, a flowchart and a functional block diagram showing flows of communication when (1a) the content offerer offered to send contents to the client A (push), and (2b) the client B requested the client A to send contents.

In FIGS. 23 to 25, corresponding steps are designated with the same symbols (S701 to S712). Different portions from those of the example shown in FIGS. 17 to 19 will be explained.

In the example shown here, as shown in FIG. 25, the client A includes content receiving-request receiving means 2009 and content sending notification means 2010 instead of the content sending-requirement obtaining means 2003 in the example shown in FIG. 19.

In the example shown here, steps S701 to 703 are the same as steps S501 to 503 in the example shown in FIGS. 17 to 19 and thus, explanation thereof will be omitted.

In step S704, the content receiving request transmitting means 3004 of the client B informs the content receiving-request receiving means 2009 of the client A that the content receiving request transmitting means 3004 desires to receive contents (step S704). The content send-permission requesting means 2004 of the client A makes contact with the server content send-permitting means 1003 of (a) the server, the content send-permitting means 1003 permits the content send-permission requesting means 2004 to send the contents to the client B (steps S705 and 706 which are the same as steps 506 and 507 in the example shown in FIGS. 17 to 19), and the content sending notification means 2010 informs the content receiving request transmitting means 3004 of the client B that the contents can be sent (step S707).

Subsequent steps S708 to 712 are the same as steps S508 to 512 in the example shown in FIGS. 17 to 19 and thus, explanation thereof will be omitted.

Figure 26:
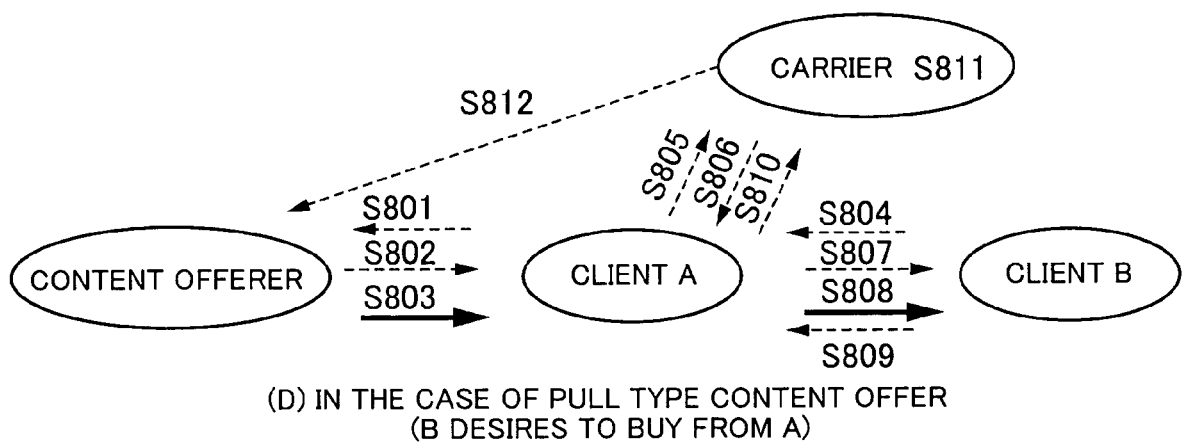
FIG. 26 is a schematic view of the communication system showing a flow of communication.
Figure 27:
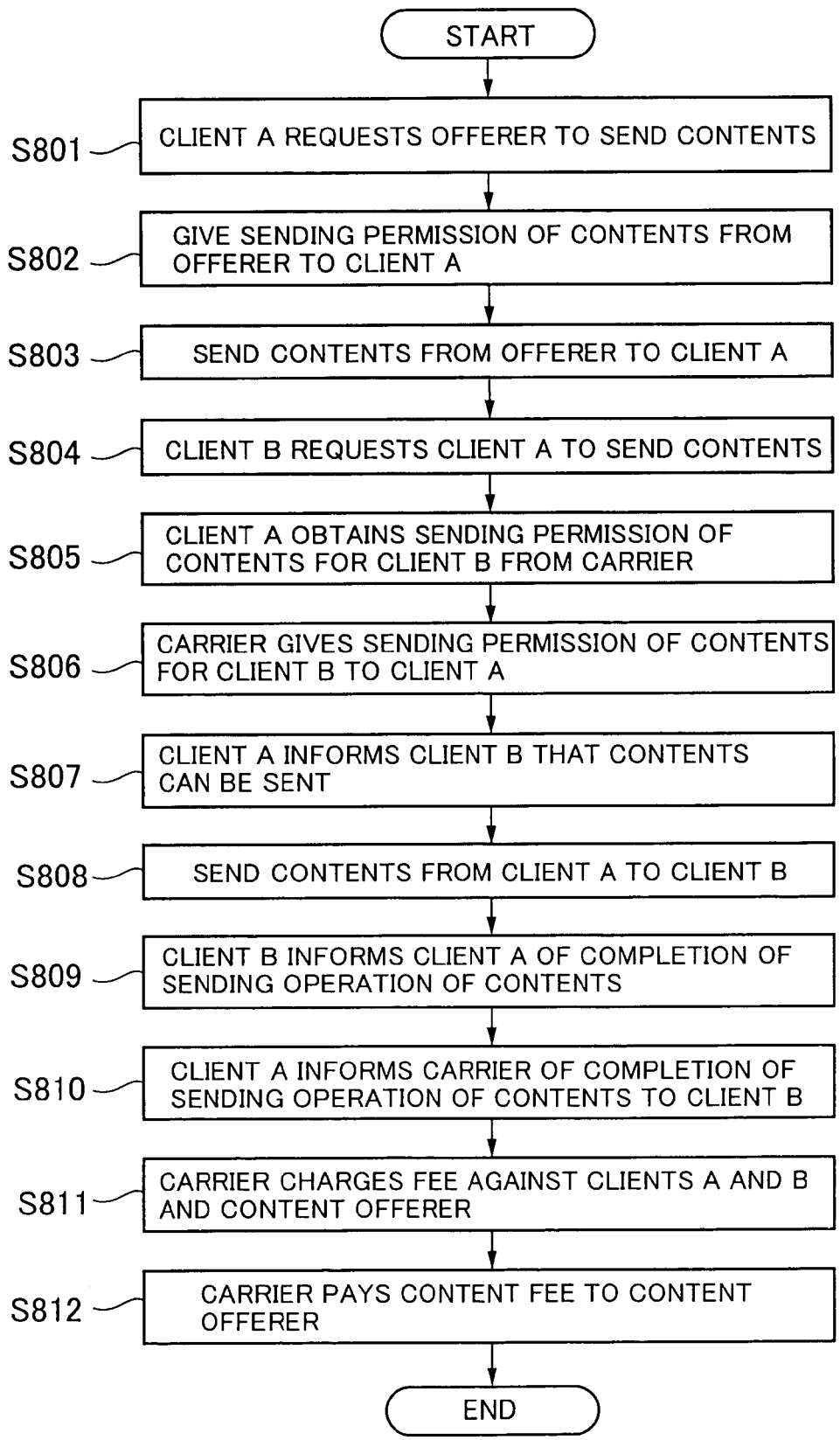
FIG. 27 is a flowchart showing a flow of communication.
Figure 28:
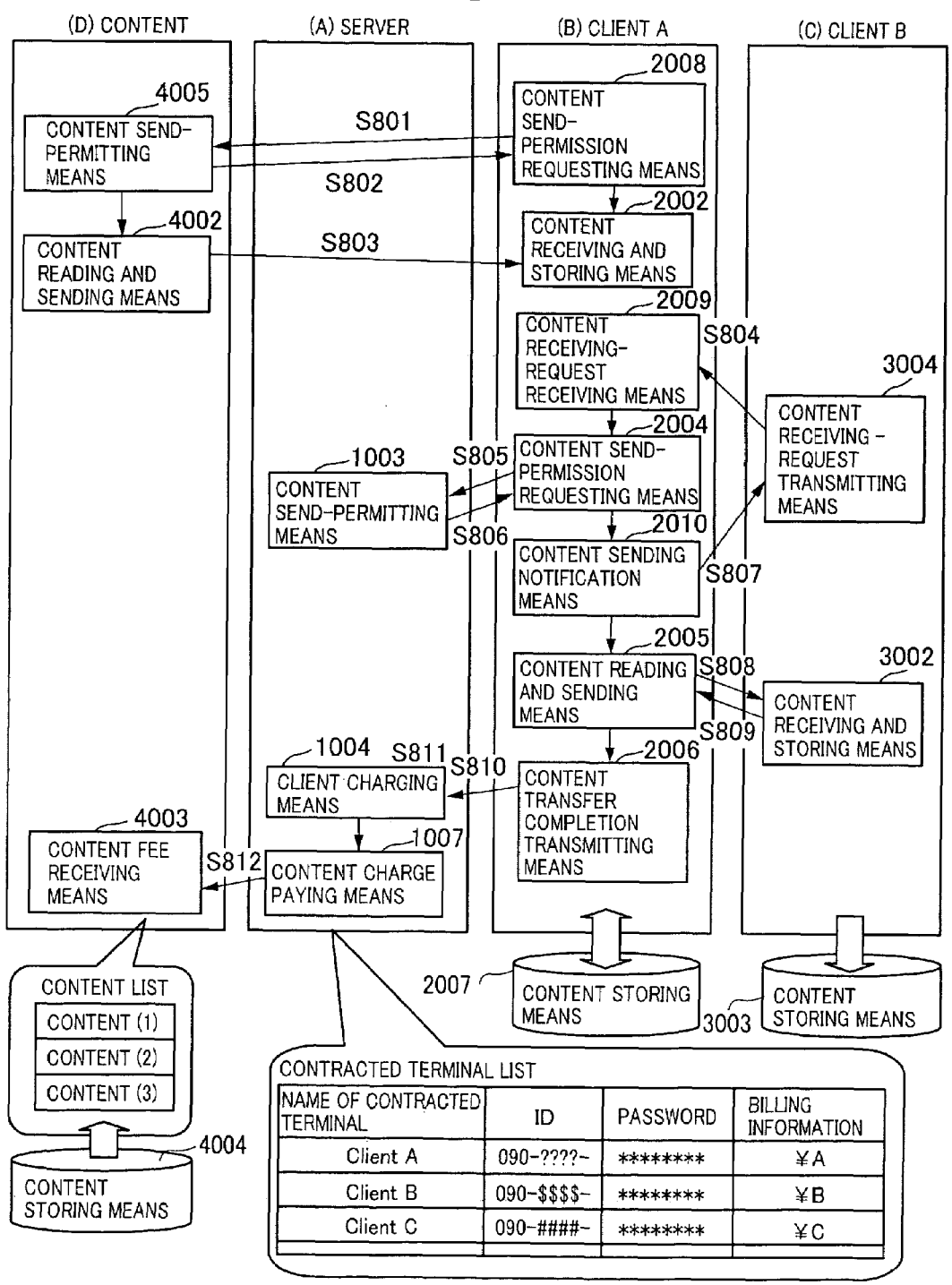
FIG. 28 is a functional block diagram showing a flow of communication.

FIGS. 26 to 28 are respectively a schematic view of the communication system, a flowchart and a functional block diagram showing flows of communication when (1b) the client A requested the content offerer to send contents (pull), and (2b) the client B requested the client A to send contents.

In FIGS. 26 to 28, corresponding steps are designated with the same symbols (S801 to S812).

Steps S801 to 803 are the same as steps S601 to 603 in the example shown in FIGS. 20 to 22. Steps S804 to 812 are the same as steps S704 to 712 in the example shown in FIGS. 23 to 25. Explanation of the same portions will be omitted.

Figure 29:
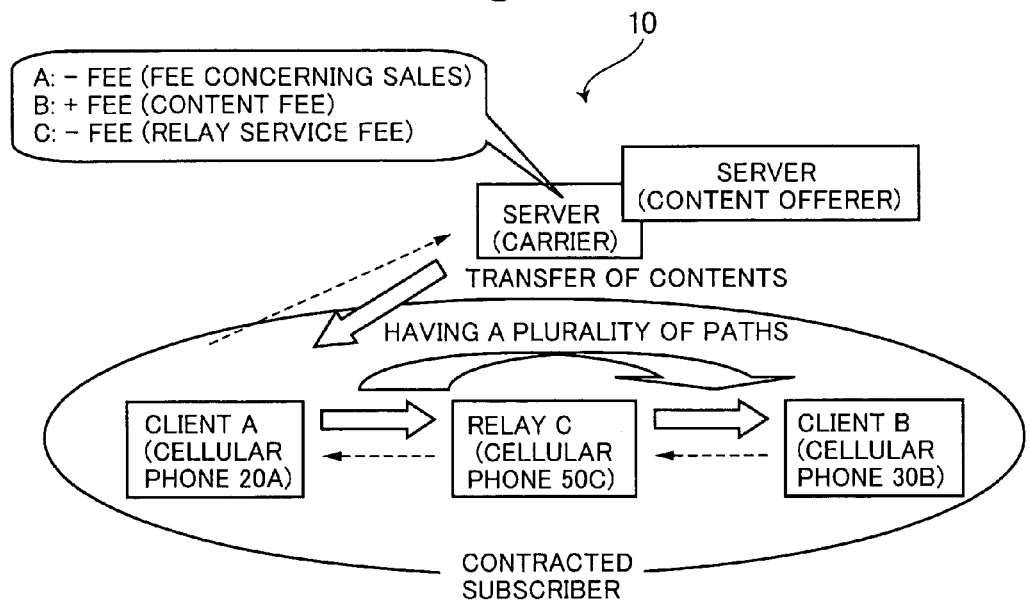
FIG. 29 shows a concept of a third communication system that realizes a third embodiment of a sending method of pay contents according to the invention.
Figure 30:
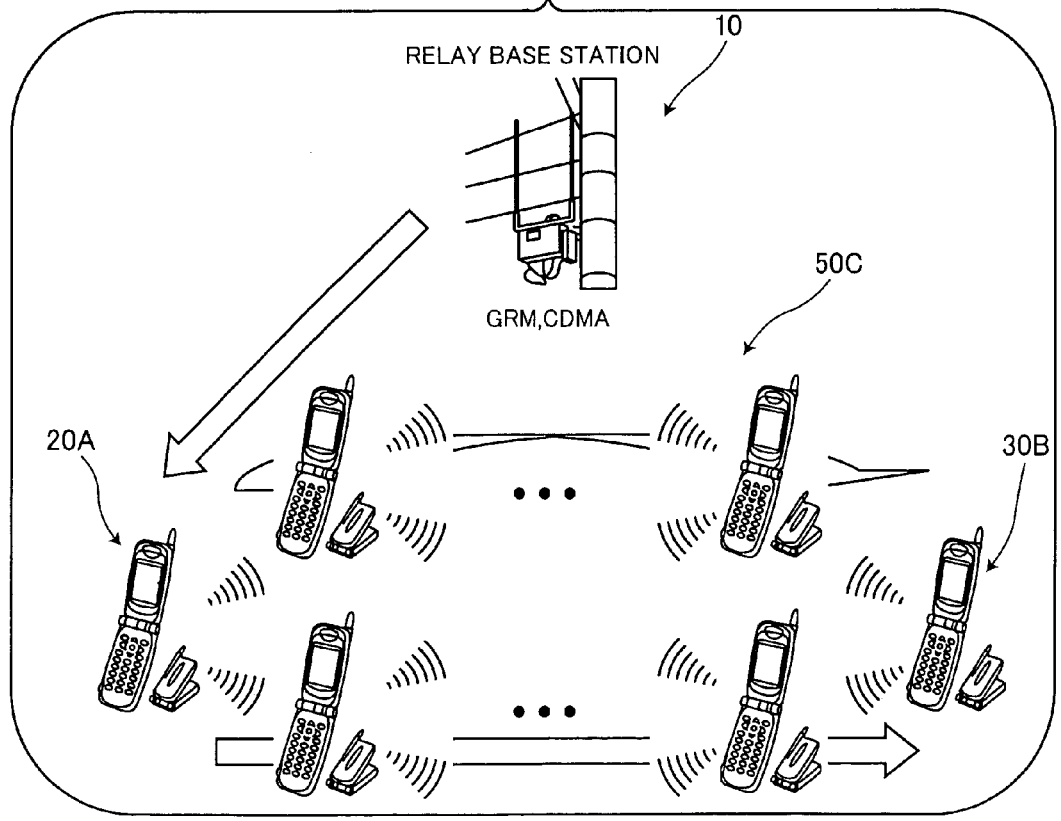
FIG. 30 shows a usage pattern of the third communication system shown in FIG. 29.

FIG. 29 shows a concept of a third communication system that realizes a third embodiment of a sending method of pay contents according to the present invention. FIG. 30 shows a usage pattern of the communication system.

In a network system including a carrier and clients, the third communication system shown in the drawings contacts the clients on line. The first communication system includes a carrier which supplies contents to the clients, a client A of the clients which receives the contents, a client B which receives the contents through the client A, and a relay C through which contents is supplied between the client A and the client B. Contents are supplied to the client B through the client A and the client C, and the third communication system charges a fee for that service against the client A, the client B and the client C at the carrier.

The third communication system is different from the first communication system shown in FIGS. 1 and 2 in that a cellular phone 50C as the relay C exists between the client A (cellular phone 20A) as a sender of the contents and the client B (cellular phone 30B) as a receiver of the contents. The cellular phone 50C as the relay C is also a cellular phone contracting the carrier (server 10). Some or many cellular phones 50C as the relay C may exist in series between the cellular phone 20A and the cellular phone 30B, and the contents may relayed from the cellular phone 20A to the cellular phone 30B in succession. As shown in FIGS. 29 and 30, it is preferable that some or many transfer paths are arranged in parallel so that the contents are reliably transferred from the cellular phone 20A to the cellular phone 30B.

In the third communication system of the embodiment shown in FIGS. 29 and 30, four cases (2×2) of the following cases will be explained in succession:

(1a) the carrier offered to send contents to the client A (push), (1b) the client A requested the carrier to send contents (pull), (2a) the client A offered to send contents to the client B, and (2b) the client B requested the client A to send contents.

Here, in order to simplify the explanation, the minimum structure, i.e., a case in which the relay of transfer of contents from the client A (cellular phone 20A) to the client B (cellular phone 30B) has only one path and only one relay C of the one path is used will be explained.

Figure 31:
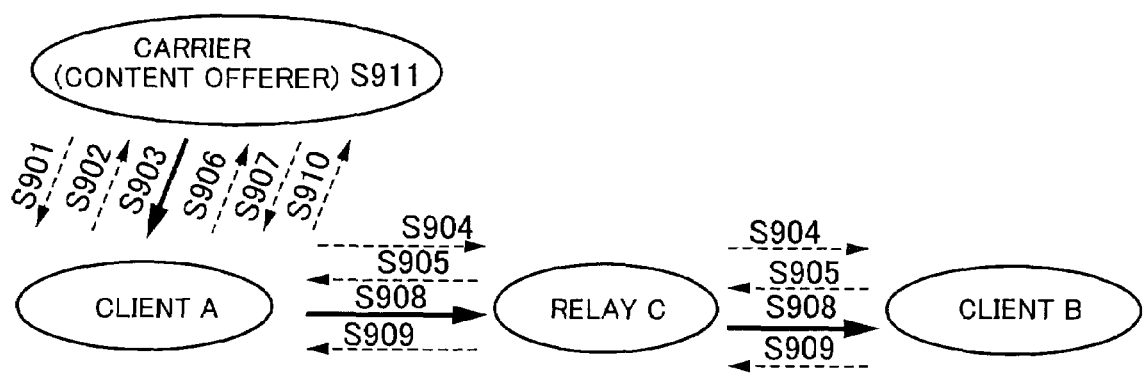
FIG. 31 is a schematic view of the communication system showing a flow of communication.
Figure 32:
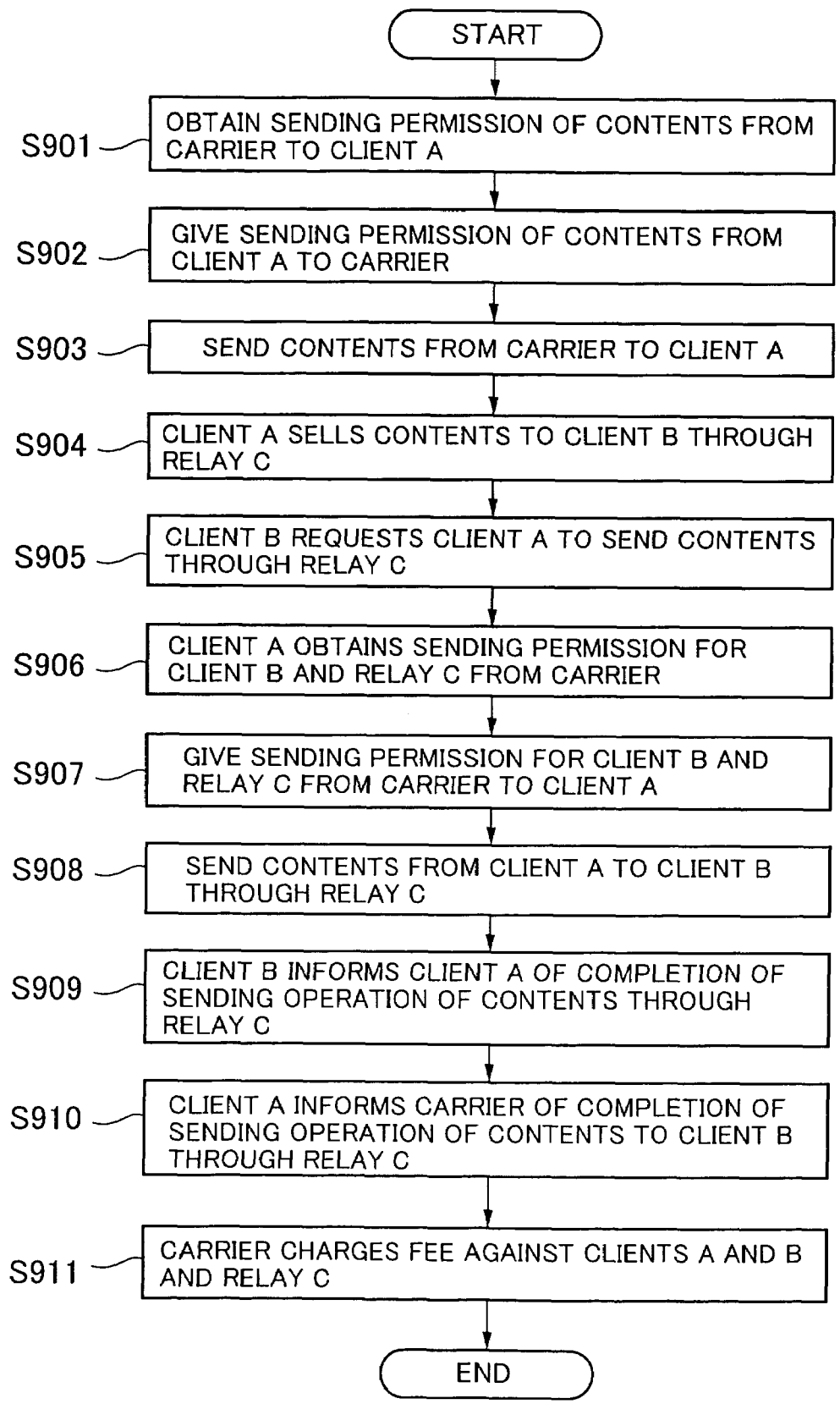
FIG. 32 is a flowchart showing a flow of communication.
Figure 33:
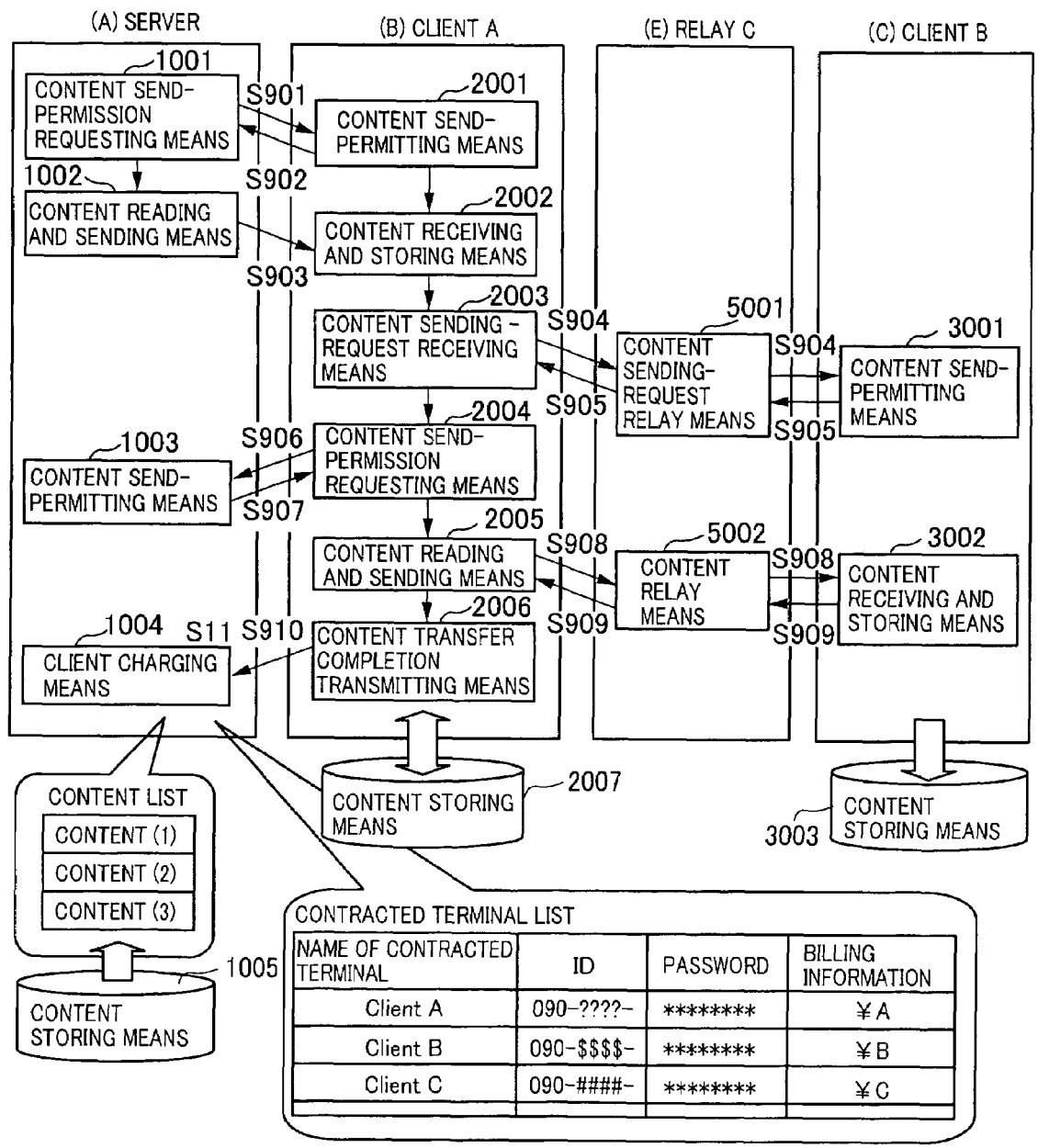
FIG. 33 is a functional block diagram showing a flow of communication.

FIGS. 31 to 33 are respectively a schematic view of the communication system, a flowchart and a functional block diagram showing flows of communication when (1a) the carrier offered to send contents to the client A (push), and (2a) the client A offered to send contents to the client B.

In FIGS. 31 to 33, corresponding steps are designated with the same symbols (S901 to S911).

Here, only different portions from those of the example shown in FIGS. 3 to 5 will be explained.

In the example shown in FIGS. 31 to 33, as shown in FIG. 33, a (e) relay C exists between the client A and the client B. The relay C includes content sending-request relay means 5001 and contents relay means 5002.

Steps S901 to 903, 906 to 907 and 910 to 911 in the example shown in FIGS. 31 to 33 are the same as steps S101 to 103, 106 to 107 and 110 to 111 in the example shown in FIGS. 3 to 5 and thus, explanation thereof will be omitted.

In the example explained with reference to FIGS. 3 to 5, as shown in FIG. 5, the content sending-requirement obtaining means 2003 of the client A sells contents directly to the content send-permitting means 3001 of the client B (step S104), the content send-permitting means 3001 of the client B responses the sales and directly informs the content sending-requirement obtaining means 2003 of the client A of the sending permission of the contents (step S105). In the example explained here, as shown in FIG. 33, the content sending-requirement obtaining means 2003 of the client A sells contents to the content send-permitting means 3001 of the client B through the content sending-request relay means 5001 of the relay C (step S904), the content send-permitting means 3001 of the client B responses the sales, and informs the content sending-requirement obtaining means 2003 of the client A of the sending permission of the contents through the content sending-request relay means 5001 of the relay C.

Similarly, in the example explained with reference to FIGS. 3 to 5, as shown in FIG. 5, the content reading and sending means 2005 of the client A reads contents to be sent to the client B from the content storing means 2007, and sends the contents directly to the client B (step S108), the client B receives the sent contents by means of the content receiving and storing means 3002 and stores the same in the content storing means 3003, and directly informs the content reading and sending means 2005 of the client A of the completion of the receipt (step S109). In the example explained here, as shown in FIG. 33, the content reading and sending means 2005 of the client A sends the contents which is to be sent to the client B, to the client B through the contents relay means 5002 of the relay C (step S908), the content receiving and storing means 3002 of the client B inform the content reading and sending means 2005 of the client A of the completion of receipt through the contents relay means 5002 of the relay C (step S909).

The example shown in FIG. 31 to 33 explained here is different from the example shown in FIGS. 1 to 3 in that the relay C exists between the client A and the client B, and communication is carried out between the client A and the client B through the relay C, i.e., by means of the peer-to-peer communication between the client A and the relay C and the peer-to-peer communication between the client B and the relay C.

Figure 34:
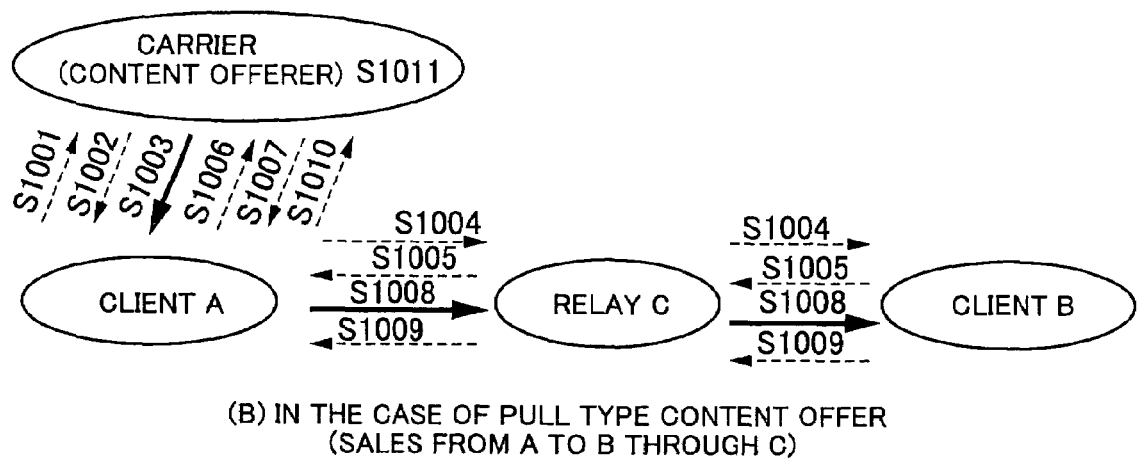
FIG. 34 is a schematic view of the communication system showing a flow of communication.
Figure 35:
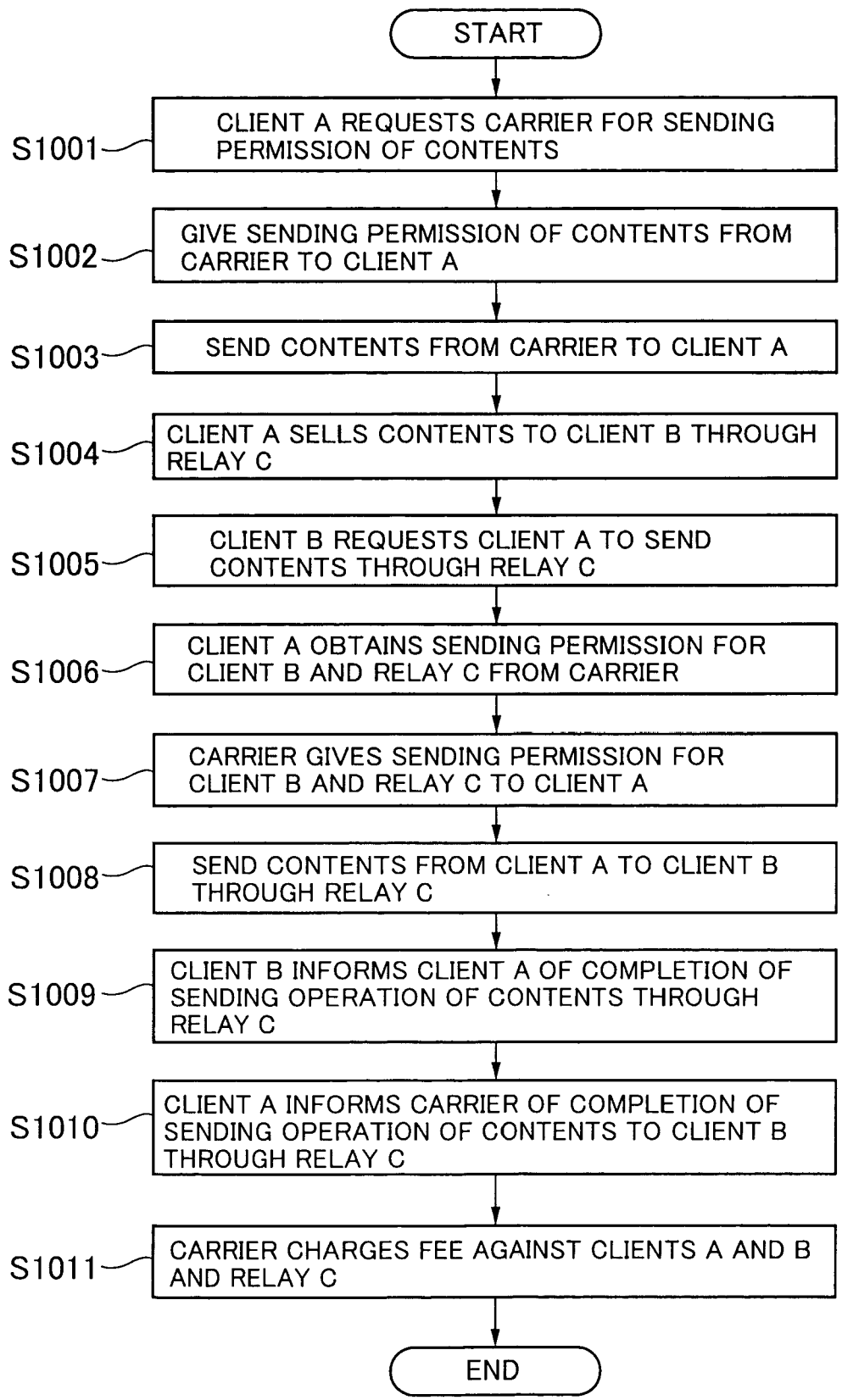
FIG. 35 is a flowchart showing a flow of communication.
Figure 36:
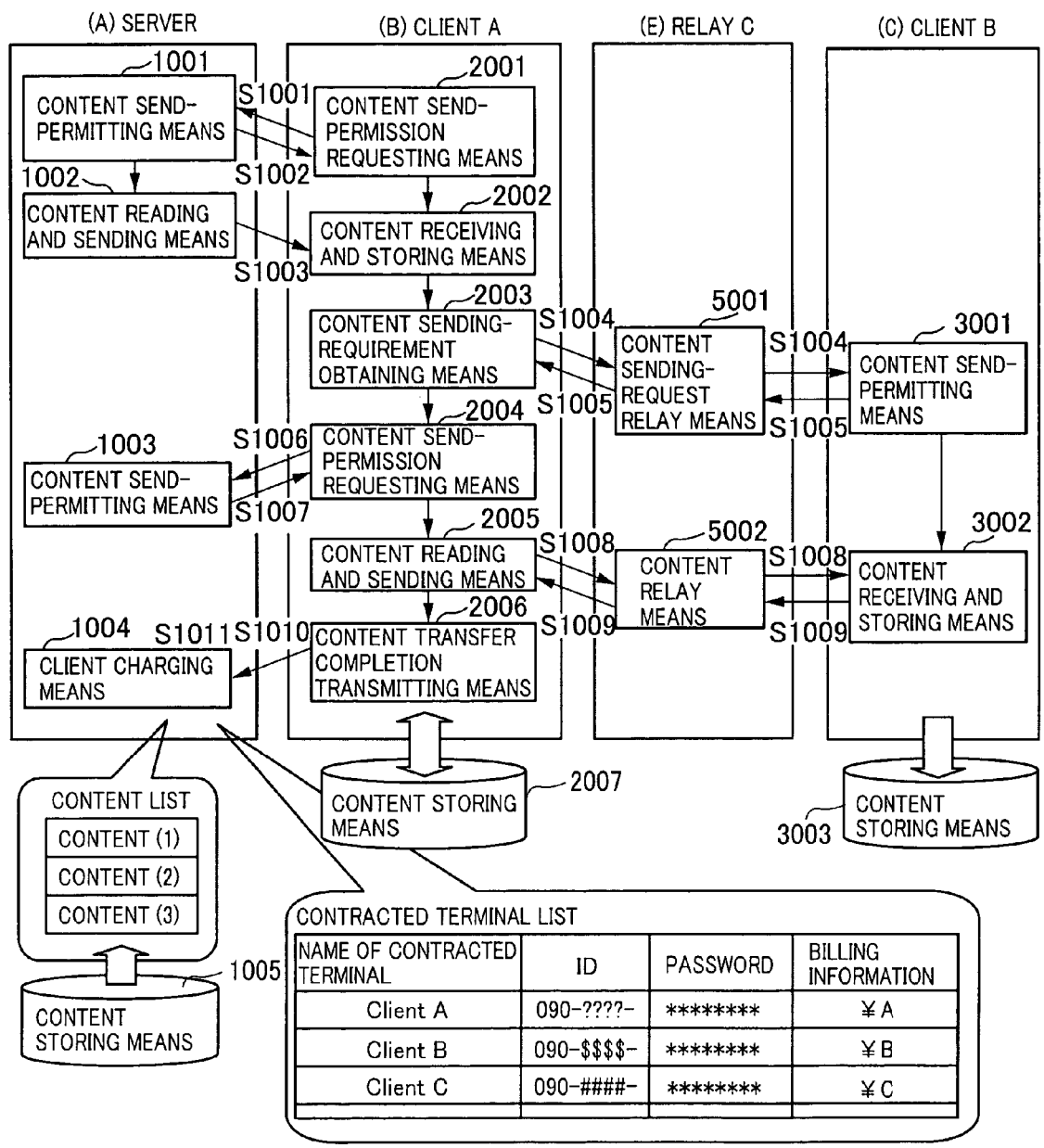
FIG. 36 is a functional block diagram showing a flow of communication.

FIGS. 34 to 36 are respectively a schematic view of the communication system, a flowchart and a functional block diagram showing flows of communication when (1b) the client A requested the carrier to send contents (pull), and (2a) the client A offered to send contents to the client B.

In FIGS. 34 to 36, corresponding steps are designated with the same symbols (S1001 to S1011).

Steps S1001 to 1003, 1006 to 1007 and 1010 to 1011 in the example shown in FIGS. 34 to 36 are the same as steps S201 to 203, 206 to 207 and 210 to 211 in the example shown in FIGS. 6 to 8 and thus, explanation thereof will be omitted.

Steps S1004 to 1005 and 1008 to 1009 and 1010 in the example shown in FIGS. 34 to 36 are the same as steps S904 to 905 and 908 to 909 in the example shown in FIGS. 31 to 33 and thus, explanation thereof will be omitted.

The example shown in FIG. 34 to 36 explained here is different from the example shown in FIGS. 4 to 6 in that the relay C exists between the client A and the client B, and communication is carried out between the client A and the client B through the relay C, i.e., by means of the peer-to-peer communication between the client A and the relay C and the peer-to-peer communication between the client B and the relay C.

Figure 37:
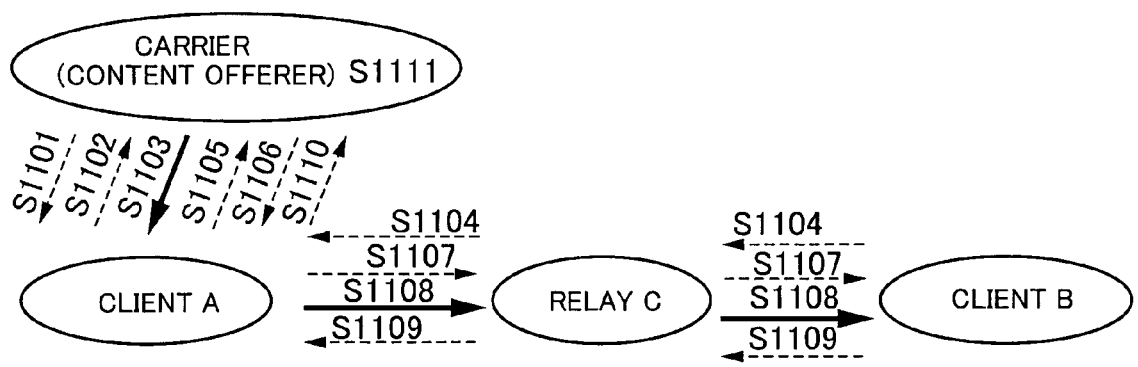
FIG. 37 is a schematic view of the communication system showing a flow of communication.
Figure 38:
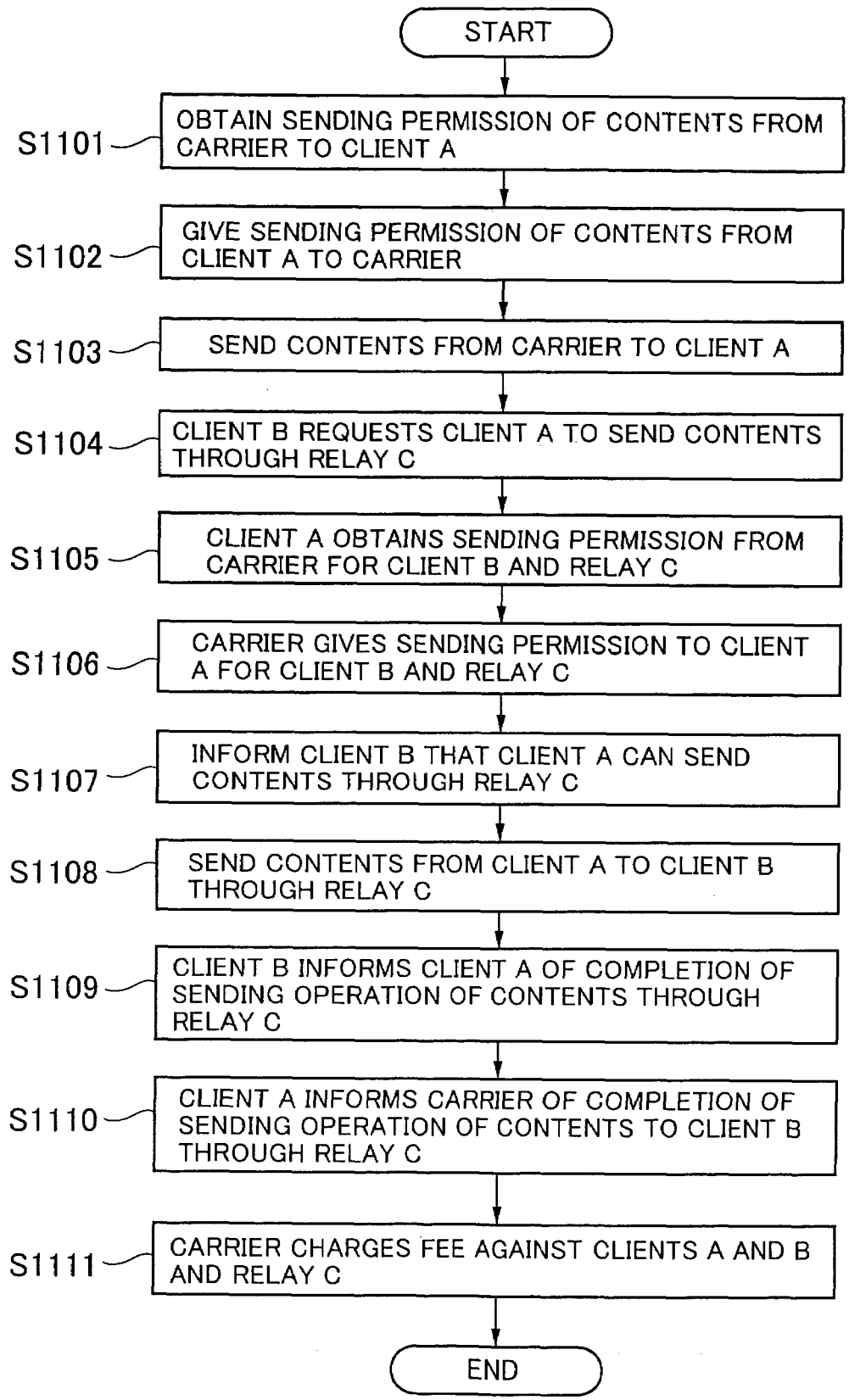
FIG. 38 is a flowchart showing a flow of communication.
Figure 39:
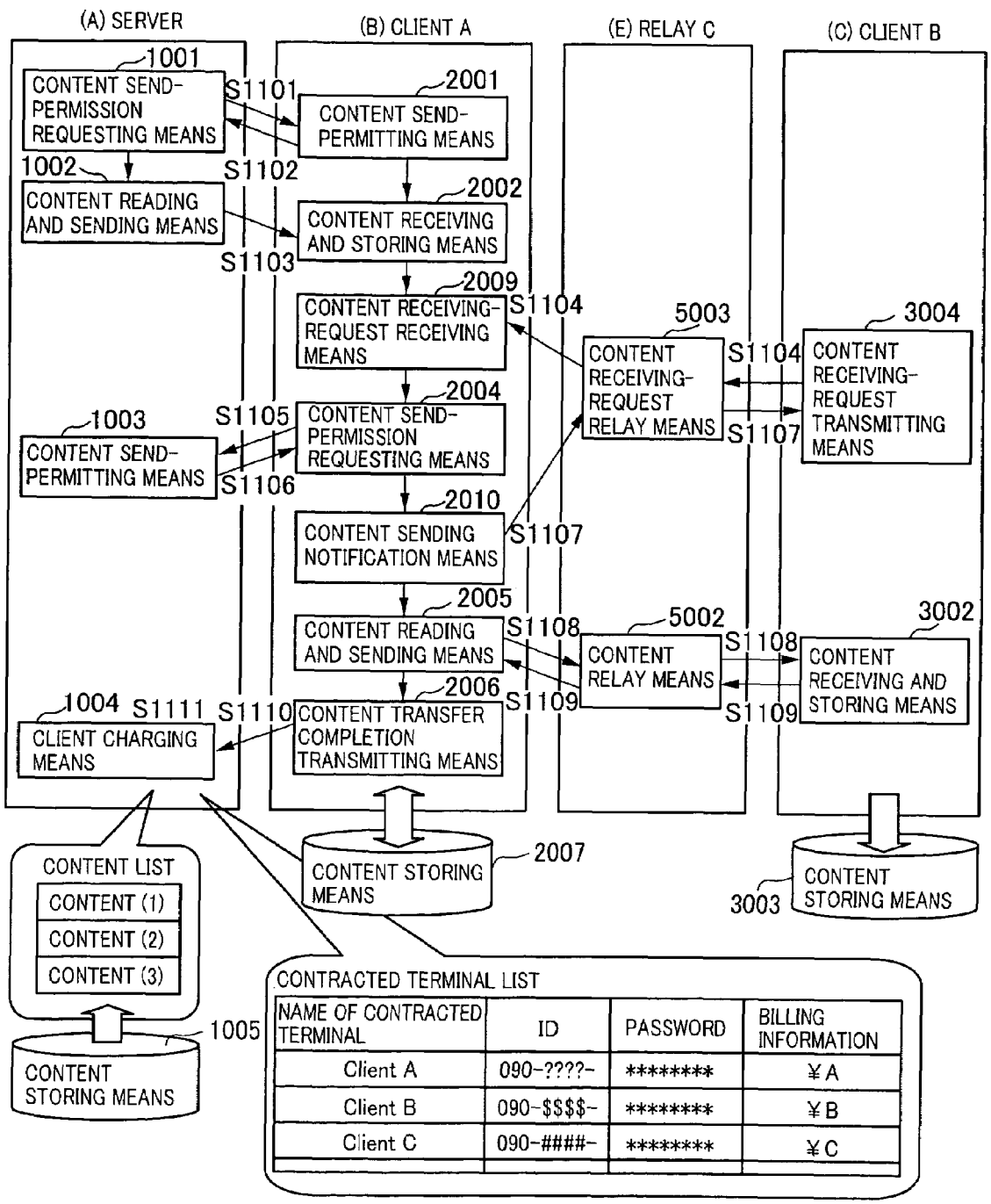
FIG. 39 is a functional block diagram showing a flow of communication.

FIGS. 37 to 39 are respectively a schematic view of the communication system, a flowchart and a functional block diagram showing flows of communication when (1a) the carrier offered to send contents to the client A (push), and (2b) the client B requested the client A to send contents.

In FIGS. 37 to 39, corresponding-steps are designated with the same symbols (S1001 to S1011). Different portions from the example shown in FIGS. 9 to 11 will be explained.

The example shown in FIGS. 37 to 39 includes (a) server, (b) client A and (c) client B which have the same structures as those of the (a) server, (b) client A and (c) client B in the example shown in FIGS. 9 to 11, and includes (e) relay C having content receiving request relay means 5003 and contents relay means 5002 between the (b) client A and (c) client B.

Steps S1101 to 1103, 1105 to 1106 and 1110 to 1111 in the example shown in FIGS. 37 to 39 are the same as steps S301 to 303, 305 to 306 and 310 to 311 in the example shown in FIGS. 9 to 11 and thus, explanation thereof will be omitted.

In the example explained with reference to FIGS. 9 to 11, in step S304 as shown in FIG. 11, the content receiving request transmitting means 3004 of the client B directly inform the content receiving-request receiving means 2009 of the client A that the client B desires to receive contents (step S304), the content send-permission requesting means 2004 of the client A makes contact with the server content send-permitting means 1003 to receive the sending permission of the contents to the client B (steps S305 and 306) and then, the content sending notification means 2010 directly informs the content receiving request transmitting means 3004 of the client B that the contents can be sent (step S307). In the example shown in FIGS. 37 to 39, communication between the client A and the client B is carried out through the content receiving request relay means 5003 of the relay C.

In steps S1108 and 1109 also, communication between the client A and the client B is carried out through the contents relay means 5002 of the relay C. Steps S1008 and 1109 are the same as steps S908, 909; 1008 and 1009 in the examples shown in FIGS. 31 to 33 and FIGS. 34 to 36 (see FIGS. 33 and 36) and thus, explanation thereof will be omitted.

Figure 40:
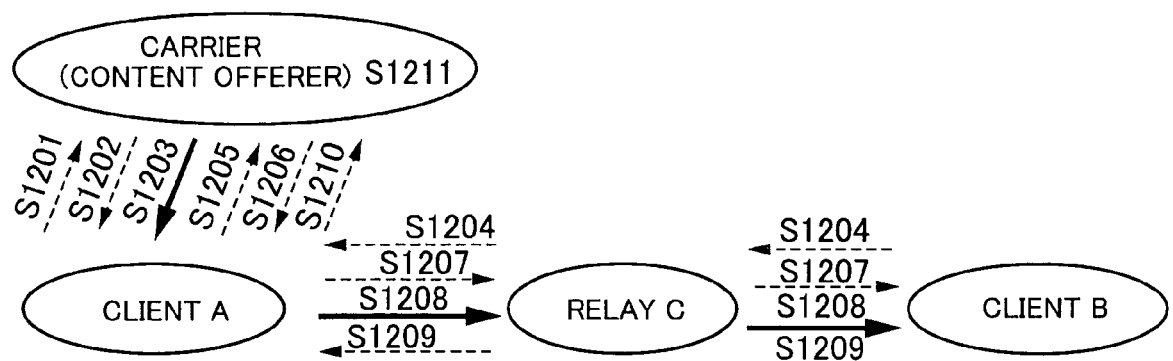
FIG. 40 is a schematic view of the communication system showing a flow of communication.
Figure 41:
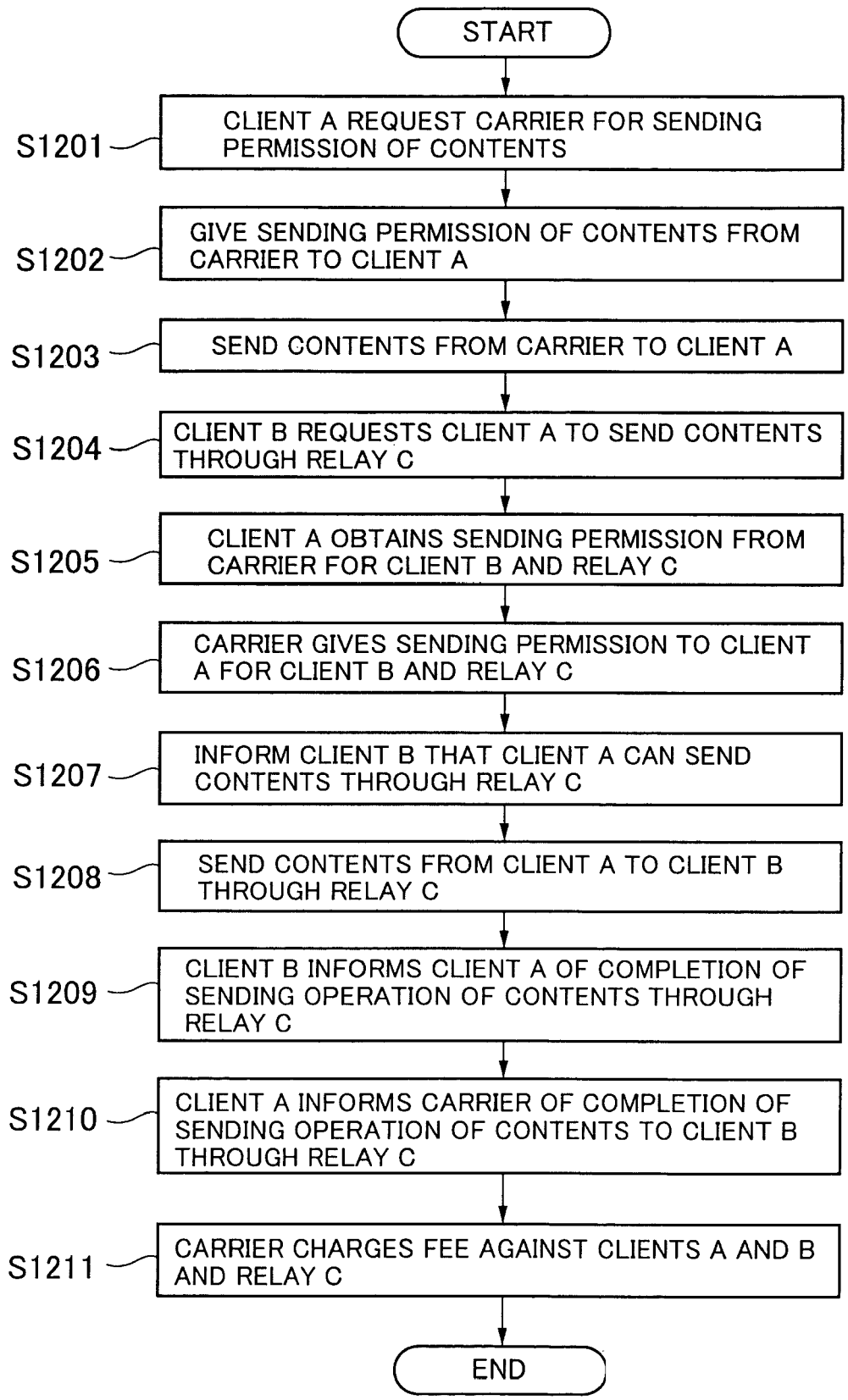
FIG. 41 is a flowchart showing a flow of communication.
Figure 42:
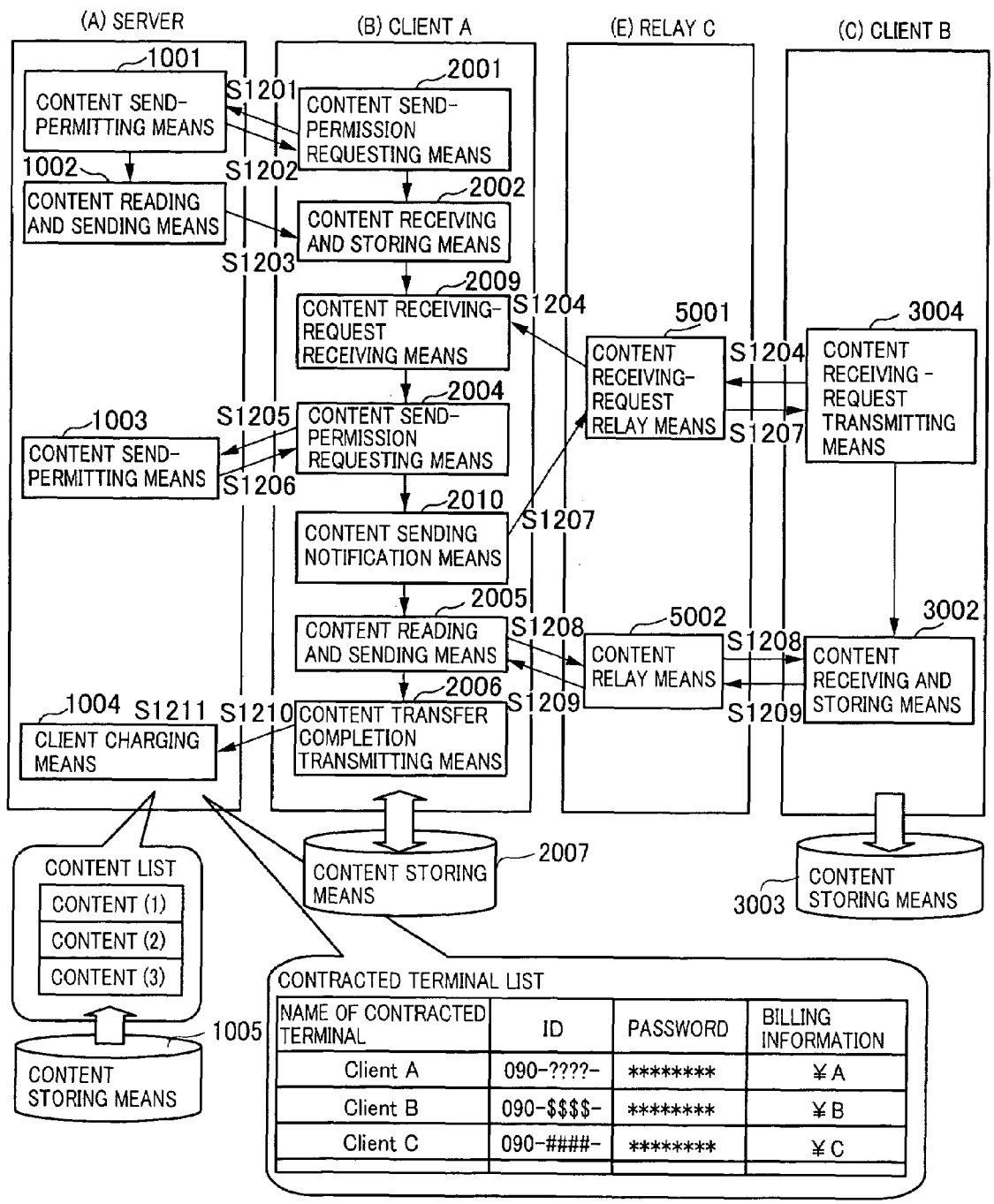
FIG. 42 is a functional block diagram showing a flow of communication.

FIGS. 40 to 42 are respectively a schematic view of the communication system, a flowchart and a functional block diagram showing flows of communication when (1b) the client A requested the carrier to send contents (pull), and (2b) the client B requested the client A to send contents.

In FIGS. 40 to 42, corresponding steps are designated with the same symbols (S1201 to S1211).

Steps S1201 to 1203, 1205 to 1206, and 1210 to 1211 in the example shown in FIGS. 40 to 42 are the same as steps S401 to 403, 405 to 406 and 410 to 411 in the example explained with reference to FIGS. 12 to 14 and thus, explanation thereof will be omitted.

Steps S1204, 1207, 1208 to 1209 in the example shown in FIGS. 40 to 42 are the same as steps 1104, 1107, and 1108 to 1109 in the example shown in FIGS. 37 to 39 and thus, explanation thereof will be omitted.

Figure 43:
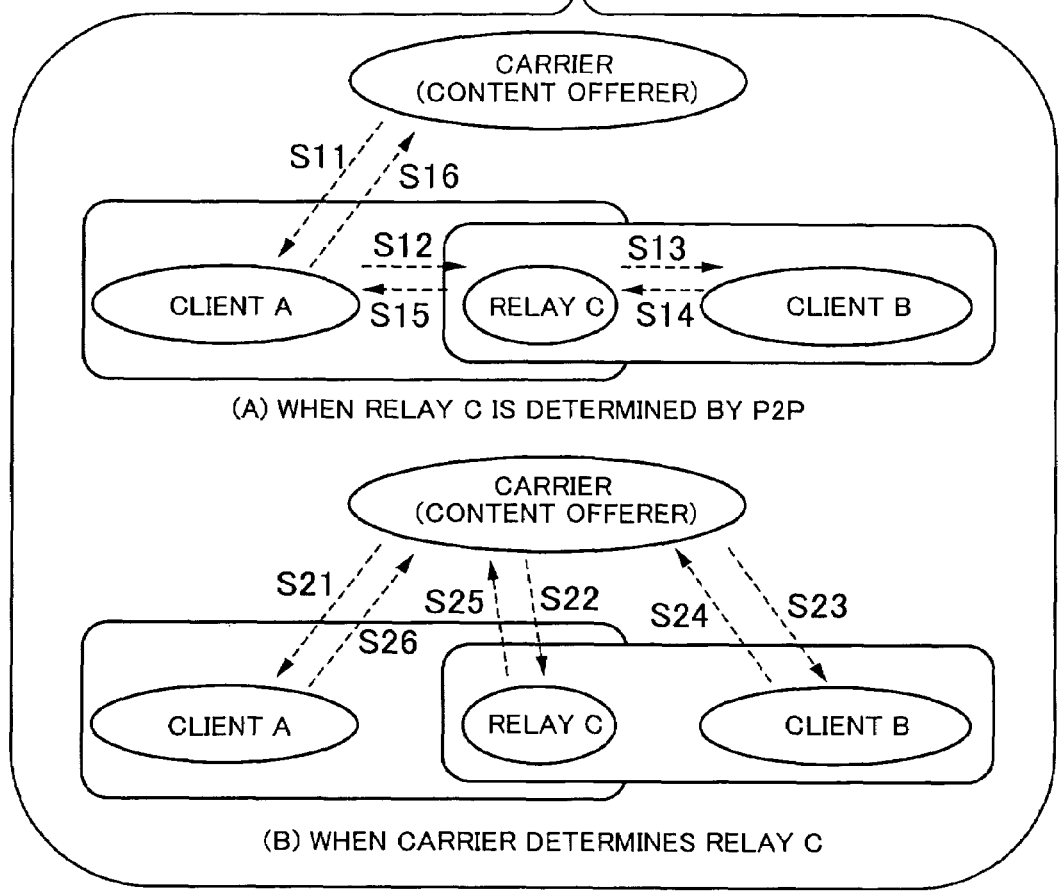
FIG. 43 is an explanatory view of a determining method of a relay C.

FIG. 43 is an explanatory view of a determining method of the relay C, wherein part (a) of FIG. 43 shows a case in which the relay C is determined by P2P (peer-to-peer communication), and part (b) of FIG. 43 shows a case in which the relay C is determined by the carrier (server 10). Outline of the determining method of the relay will be explained.

As shown in part (a) of FIG. 43, when the relay C is determined by the peer-to-peer, the client A receives permission of search of the relay C from the carrier (step S11) and then, the client A requests the relay (candidate) C to relay the client B. The relay (candidate) C tries to carry out communication with the client B (step S13), the relay (candidate) C can make contact with the client B and obtains agreement of relay from the client B (step S14), the relay (candidate) C informs the client A that the relay is possible (step S15). The client A informs the carrier that relay C is used as the relay of communication between the client A and the client B (step S16).

As shown in FIG. 43(b), when carrier is allowed to determine the relay C, the client A requests the carrier to determine the relay between the client B and client A (step S21). The carrier makes contact with the relay (candidate) C and the client B (steps S22 and 23) and obtains agreement of communication that relay (candidate) C is used as the relay from the client B (step S24), and obtains agreement of relay from the relay (candidate) C (step S25). The carrier informs the client A that communication can be carried out between the client A and the client B through the relay C (step S26).

Here, although two examples of parts (a) and (b) in FIG. 43 are shown as the determining method of the relay C, these parts (a) and (b) may be combined so that the transfer path of contents from the client A to the client B can be secured more reliably.

Figure 44:
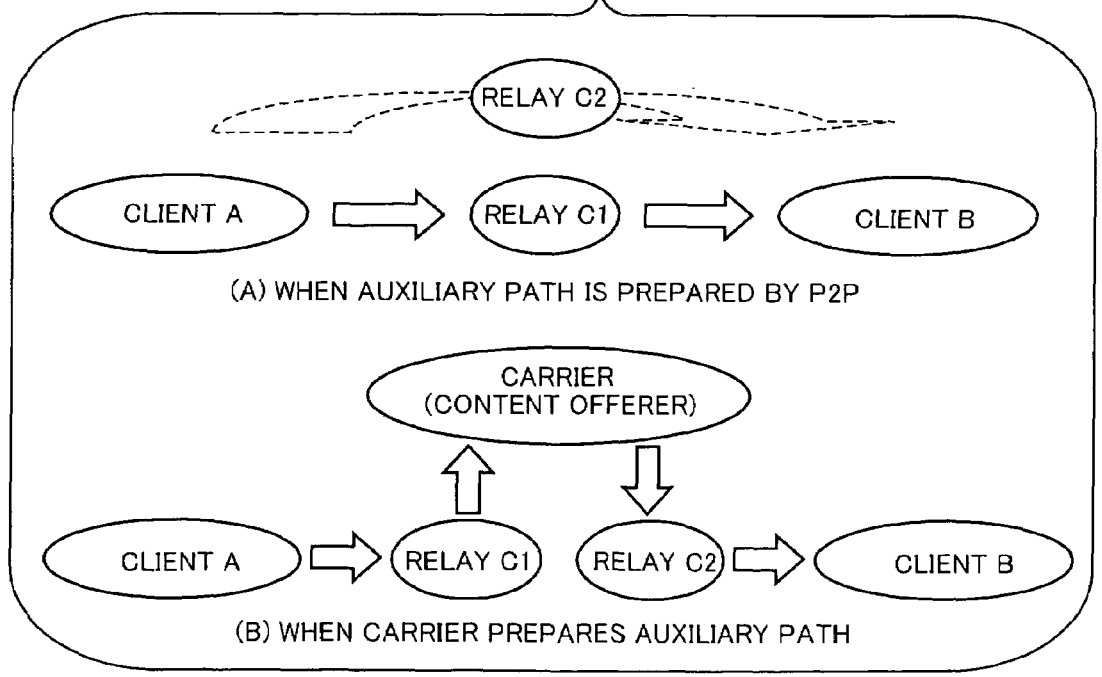
FIG. 44 shows means that secures a communication path between a client A and a client B more reliably.

FIG. 44 shows means which more reliably secure the communication path between the client A and the client B.

Part (a) of FIG. 44 is a schematic view showing that an auxiliary path is prepared by P2P communication. When the peer-to-peer communication of a cellular phone which subscribed this communication system has a broadcasting function in a narrow area for example, communication paths including the auxiliary path are previously prepared by asking cellular phones for relay using the broadcasting function. With this, contents can be transferred from the client A to the client B more reliably.

Part (b) of FIG. 44 is a schematic view showing that a portion of a communication path is a communication path flowing through a carrier.

When a path connecting the client A and the client B through the peer-to-peer communication, the carrier may function as a portion of the communication path. The communication speed between the cellular phone and the carrier is slow, and if the carrier functions as a portion of the communication path, time required for transferring the contents from the client A to the client B is increased. However, when it is absolutely necessary to transfer the contents to the client B immediately, it is better to secure a path through which communication can be carried out even if the communication speed is reduced, and it is preferable that the carrier can function as a portion of the communication path as shown in part (b) of FIG. 44 as the last means for caution's sake.

What is claimed is:

1. A sending method of pay contents in a communication system, which carries out communication through a predetermined network by a predetermined first communication scheme and which comprises a plurality of radio terminals that carry out a peer-to-peer communication by a predetermined second communication scheme and a carrier that carries out communication by the first communication scheme with each of the plurality of radio terminals, the sending method comprising:

a transfer permission receiving step for receiving, from the carrier, permission of transfer of predetermined pay contents to a predetermined second radio terminal of the plurality of radio terminals, the permission obtained by one of the plurality of radio terminals as a first radio terminal through communication by the first communication scheme between the carrier and the first radio terminal, a transfer step in which upon reception of the permission from the carrier in the transfer permission receiving step, the first radio terminal transfers the pay contents to the second radio terminal through communication by the second communication scheme, a completion notification receiving step in which the first radio terminal receives, from the second radio terminal, notification that reception of the pay contents is completed through communication using the second communication scheme, a completion reporting step in which the first radio terminal reports to the carrier that sending operation of the pay contents to the second radio terminal is completed, through communication using the first communication scheme, and a charging step in which the carrier charges fees concerning sending and receiving operations of the pay contents against the first radio terminal and the second radio terminal.

2. The sending method of pay contents according to claim 1, further comprising a sending step in which the first radio terminal receives the pay contents from the carrier through communication using the first communication scheme, wherein the sending step is carried out before the transfer permission receiving step.

3. The sending method of pay contents according to claim 1, wherein the communication system includes, in addition to the carrier, a content offering server which sends pay contents, the sending method further comprises a sending step in which the first radio terminal receives the pay contents from the content offering server, the sending step being carried out before the transfer permission receiving step, in the charging step, the carrier charges fees concerning sending and receiving operations of the pay contents against the first radio terminal, the second radio terminal and the content offering server.

4. The sending method of pay contents according to claim 1, wherein the transfer step and the completion notification step are carried out by direct peer-to-peer communication between the first radio terminal and the second radio terminal.

5. The sending method of pay contents according to claim 1, wherein the transfer step and the completion notification step are carried out by peer-to-peer communication through the first radio terminal and at least one of the plurality of radio terminals as a third radio terminal, in the charging step, the carrier charges fees concerning sending and receiving operations of the pay contents against the first radio terminal, the second radio terminal and the third radio terminal.

6. The sending method of pay contents according to claim 1, wherein in the transfer step and the completion notification step, when it is impossible to carry out peer-to-peer communication between the first radio terminal and the second radio terminal directly or relayed by at least one of a plurality of radio terminals as a third radio terminal, communication is carried out utilizing a communication path at least partially including a communication path using the first communication scheme having the carrier interposed in the communication path.

7. Any one of a plurality of radio terminals each carrying out communication using a predetermined first communication scheme between the radio terminal and a carrier which carries out communication through a predetermined communication network using the first communication scheme, and each carrying out peer-to-peer communication using a predetermined second communication scheme with each of the plurality of the radio terminals, wherein the one of the plurality of radio terminals comprises:

a transfer permission receiving unit which receives, from the carrier, permission of the transfer of predetermined pay contents to a predetermined second radio terminal of the plurality of radio terminals, the permission obtained by the one of the plurality of radio terminals by communication using the first communication scheme, a transfer step in which upon reception of the permission from the carrier in the transfer permission receiving unit, the pay contents are transferred to the second radio terminal through communication using the second communication scheme, a completion notification receiving unit that receives notification that receiving operation of the pay contents from the second radio terminal is completed, through communication using the second communication scheme, and a completion reporting unit in which the carrier is informed that sending operation of the pay contents to the second radio terminal is completed, through communication using the first communication scheme.

8. A carrier which carries out communication through a predetermined communication network using a predetermined first communication scheme and which carries out communication using the first communication scheme with each of a plurality of radio terminals which carries out peer-to-peer communication using a predetermined second communication scheme, wherein the carrier comprises a transfer permitting unit which permits any one of the plurality of radio terminals as a first radio terminal to transfer predetermined pay contents obtained by the first radio terminal to a predetermined second radio terminal of the plurality of radio terminals, a completion report receiving unit which receives a report that sending operation of the pay contents to the second radio terminal from the first radio terminal is completed, and a charging unit which charges fees concerning sending and receiving operations of the pay contents against the first radio terminal and the second radio terminal.

* * * * *